(12) United States Patent
Ichihashi

(10) Patent No.: US 10,302,900 B2
(45) Date of Patent: May 28, 2019

(54) LENS DRIVE DEVICE

(71) Applicant: TDK CORPORATION, Tokyo (JP)

(72) Inventor: Shusuke Ichihashi, Tokyo (JP)

(73) Assignee: TDK CORPORATION, Tokyo (JP)

(*) Notice: Subject to any disclaimer, the term of this patent is extended or adjusted under 35 U.S.C. 154(b) by 67 days.

(21) Appl. No.: 15/584,403

(22) Filed: May 2, 2017

(65) Prior Publication Data
US 2017/0329099 A1 Nov. 16, 2017

(30) Foreign Application Priority Data

May 13, 2016 (JP) ................... 2016-097217

(51) Int. Cl.
*G02B 7/02* (2006.01)
*G02B 7/10* (2006.01)

(52) U.S. Cl.
CPC ...................... *G02B 7/10* (2013.01)

(58) Field of Classification Search
CPC . G02B 7/00; G02B 7/02; G02B 7/023; G11B 7/0937; G11B 7/0925
USPC ................... 359/811, 819, 822–824
See application file for complete search history.

(56) References Cited

U.S. PATENT DOCUMENTS

| 2015/0131166 A1* | 5/2015 | Wu .......................... G02B 7/10 359/702 |
| 2017/0082829 A1 | 3/2017 | Kudo et al. |

FOREIGN PATENT DOCUMENTS

JP      2015-232682 A     12/2015

\* cited by examiner

*Primary Examiner* — William Choi
(74) *Attorney, Agent, or Firm* — Oliff PLC

(57) ABSTRACT

A lens drive device includes a lens holder capable of holding at least one lens and a frame arranged around the holder and holding the holder relatively movable along a light axis of the lens. At least three stopper convex portions protruding toward the frame are formed on an outer circumference of the holder. Stopper concave portions housing each of the stopper convex portions are formed on the frame correspondingly to the stopper convex portions. A convex intersection corner between the first convex end surface and the convex side surface has a chamfering portion or an R curved surface portion to avoid touching a concave intersection corner between the concave bottom surface and the concave side surface.

9 Claims, 29 Drawing Sheets

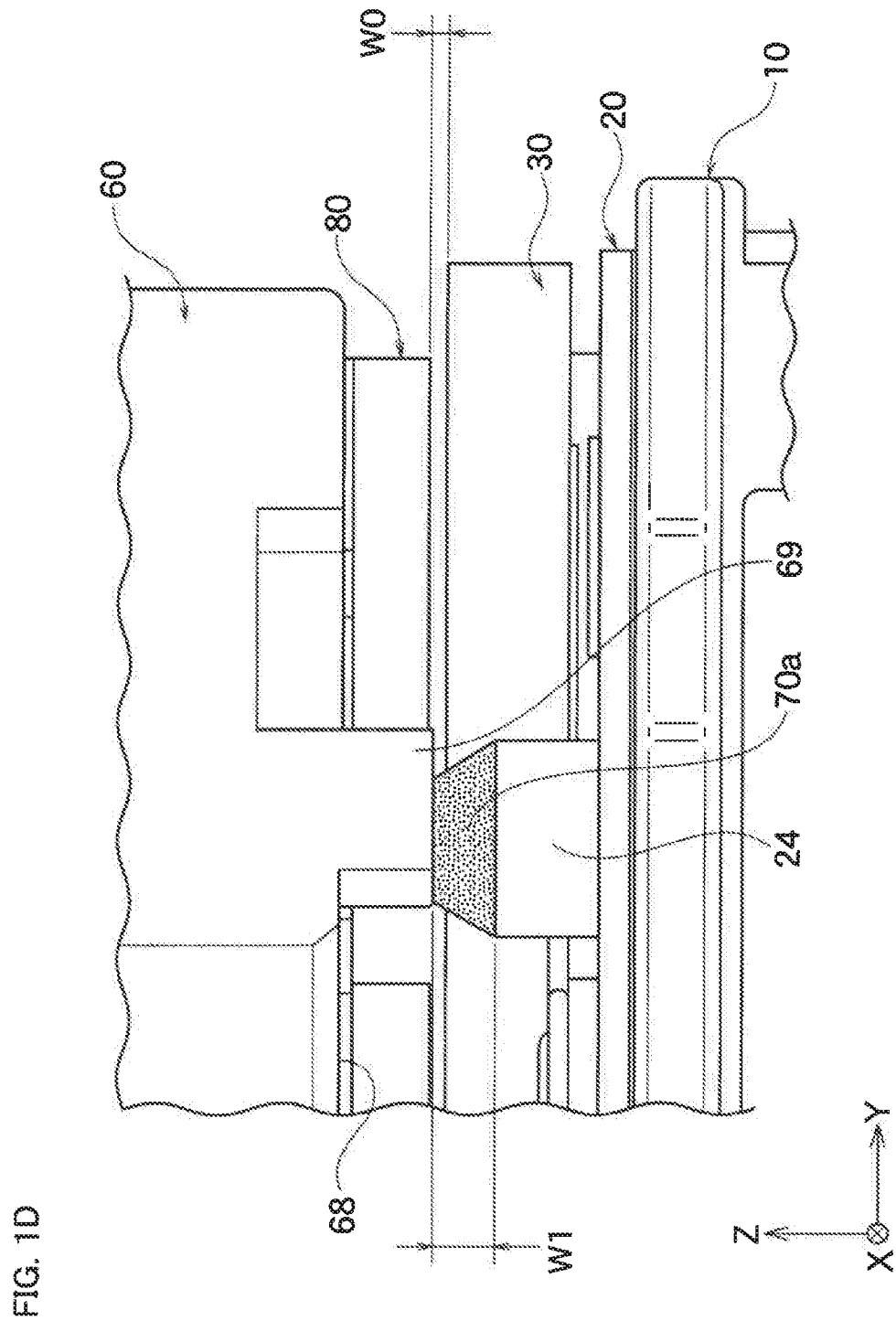

FIG. 1F
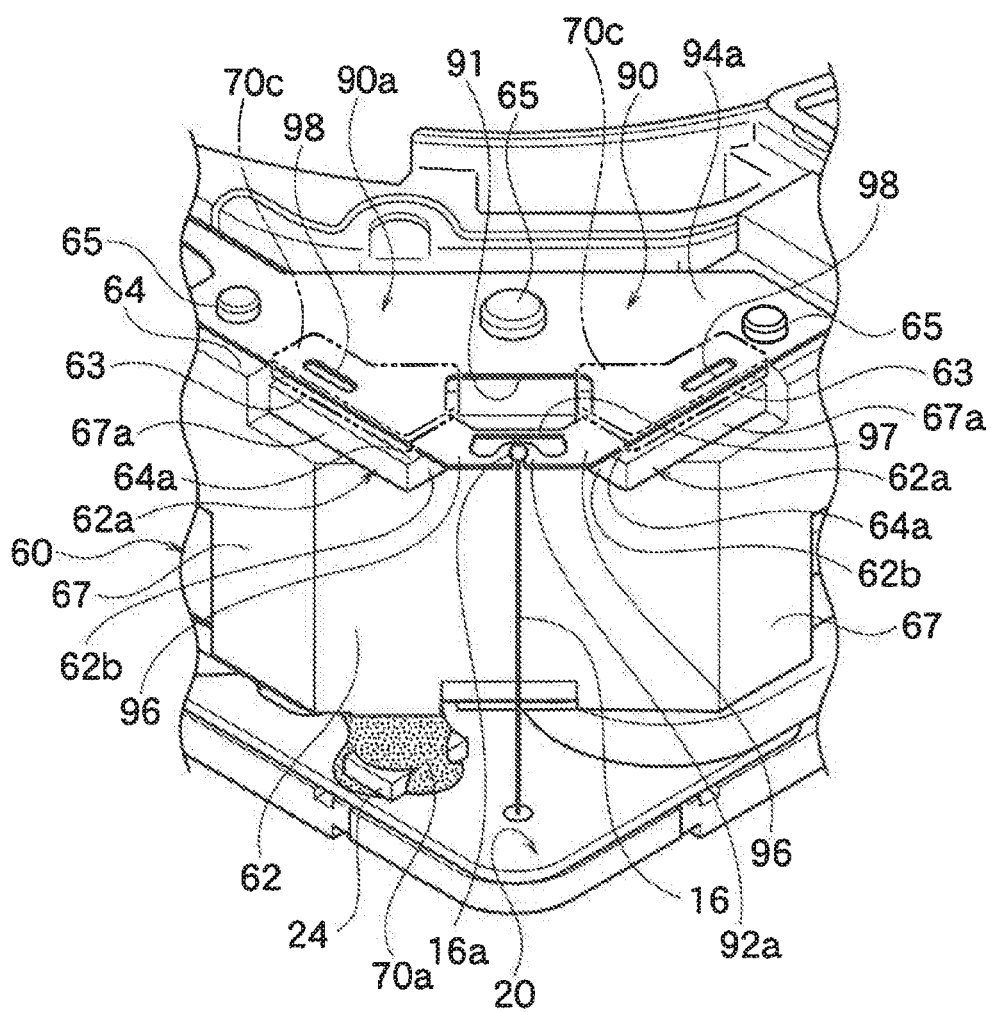
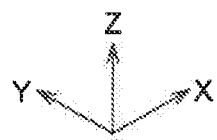

FIG. 1M
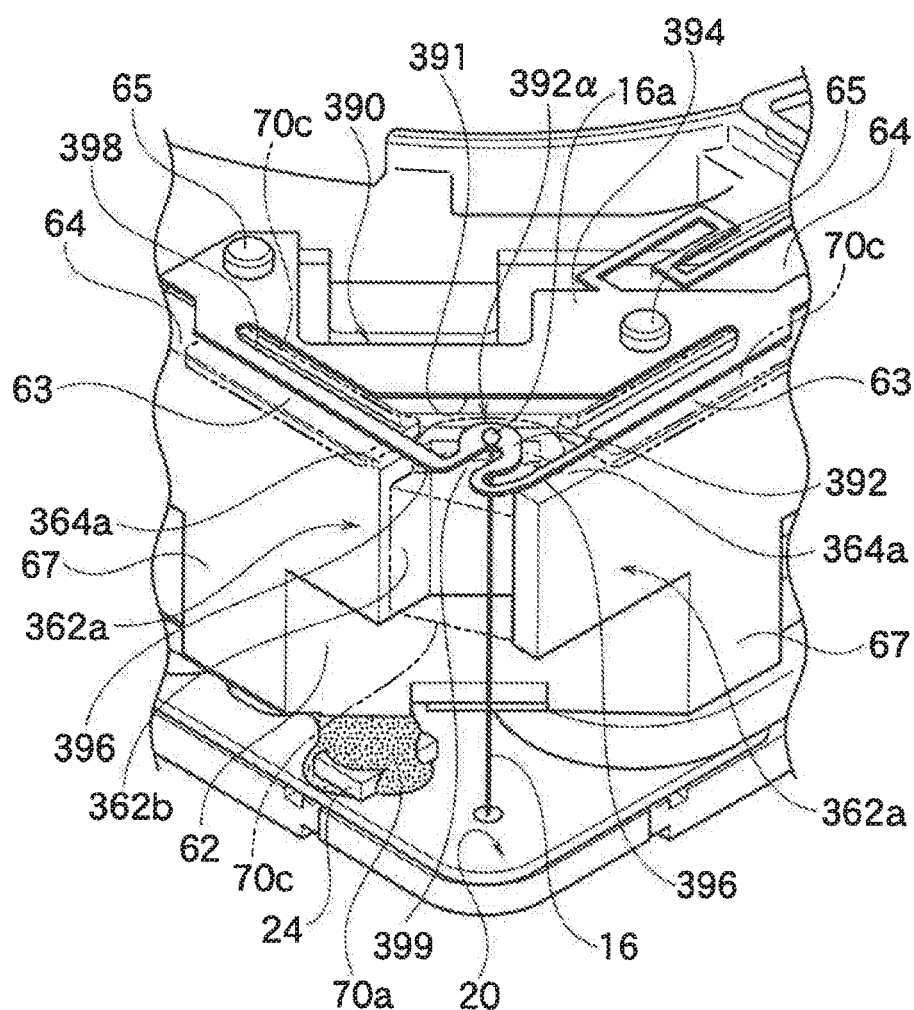
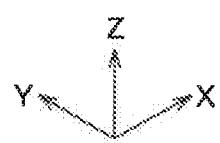

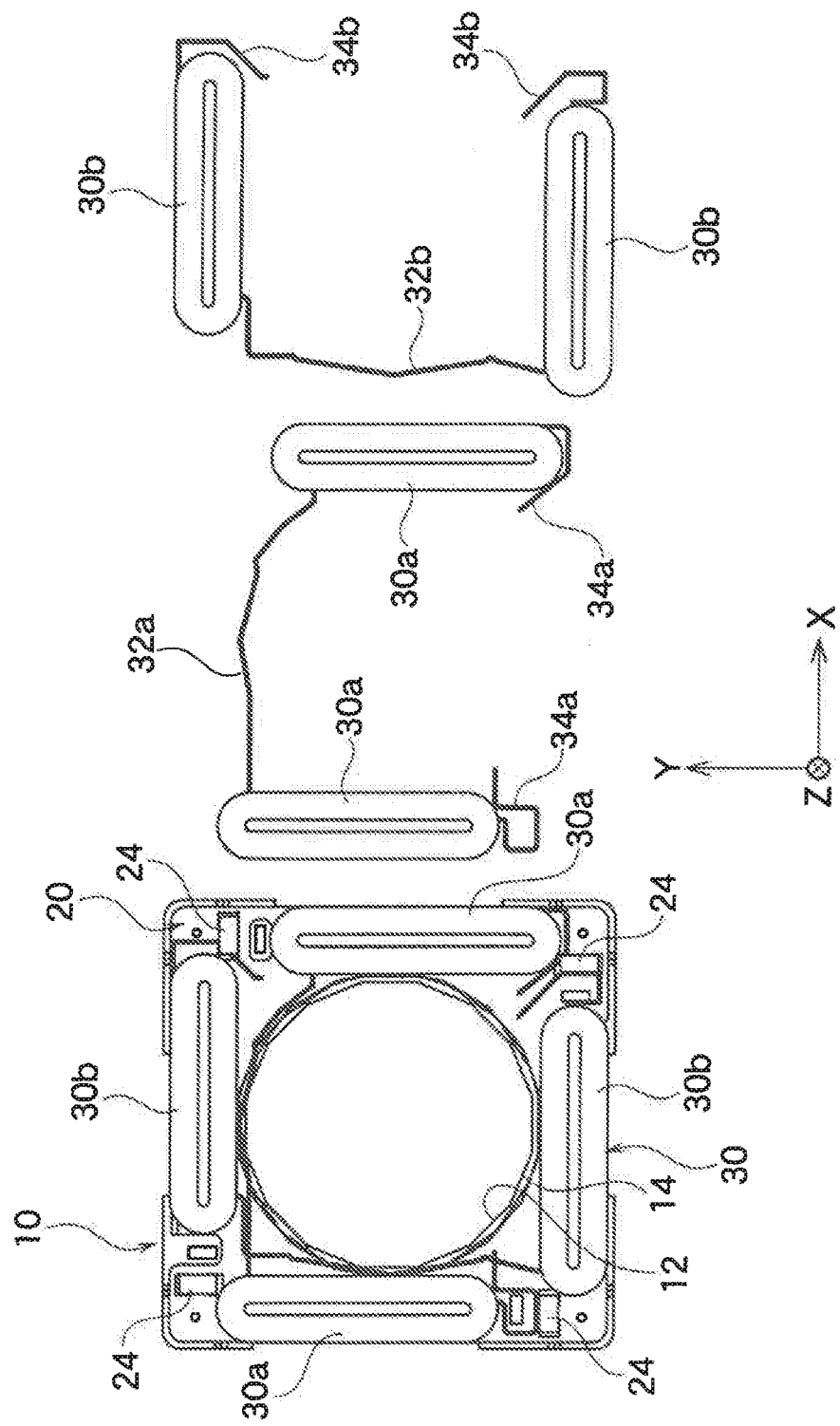

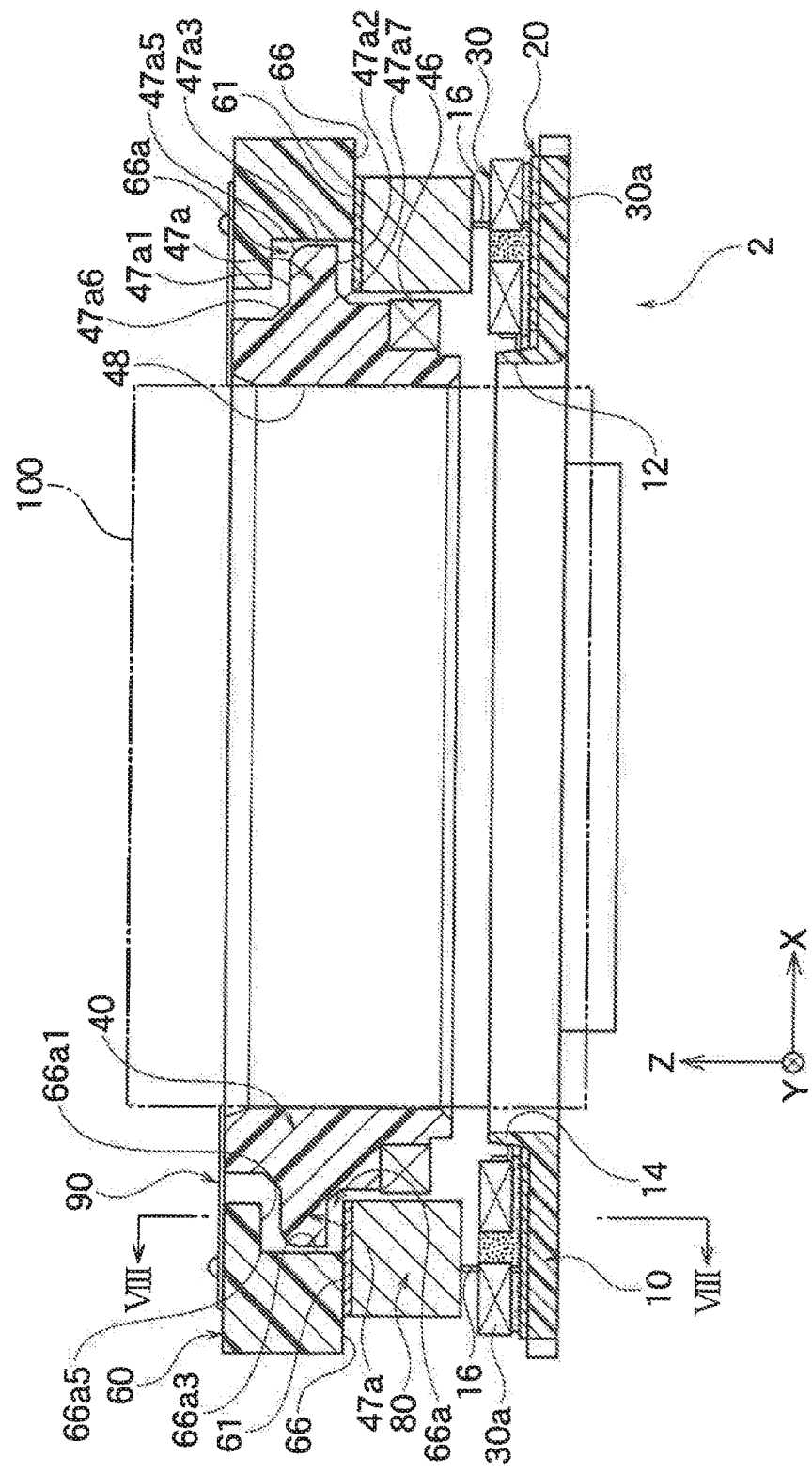

LENS DRIVE DEVICE

BACKGROUND OF THE INVENTION

1. Field of the Invention

The present invention relates to a lens drive device favorably used for a camera module of mobile phones, for example.

2. Description of the Related Art

In lens drive devices favorably used for a camera module of mobile phones, a device for carrying out an auto-focusing operation by moving a lens holder holding a lens to a frame in a light axis direction is in development.

In conventional devices, Patent Document 1 proposes to provide stopper convex portions on an outer circumferential portion of a lens holder for limiting an axial movement of the lens holder to a frame.

However, the conventional device is provided with two types of stopper convex portions including stopper convex portions for limiting an upward movement and stopper convex portions for limiting a downward movement and is provided with eight convex portions in total in a circumferential direction, and the conventional device is thus disadvantageous in downsizing. The conventional device is also disadvantageous in that in a drop of a device containing the conventional lens drive device, corners of the stopper convex portions collide with concave portions of the frame, are chipped easily, and generate scrap easily. Furthermore, the conventional device is disadvantageous in that the breakage of the frame and the distortion of the lens holder are generated easily due to a drop impact.

Patent Document 1: JP 2015-232682A

SUMMARY OF THE INVENTION

The present invention has been achieved under such circumstances. It is an object of the invention to provide a lens drive device capable of preventing breakage of a frame and distortion of a lens holder due to a drop impact and restraining generation of scrap.

To achieve the above object, the lens drive device according to a first aspect of the present invention is a lens drive device including:

a lens holder capable of holding at least one lens;

a frame arranged around the lens holder and holding the lens holder relatively movable along a light axis of the lens; and a drive portion in a light axis direction moving the lens holder relatively to the frame along the light axis, wherein at least three stopper convex portions protruding toward the frame are formed on an outer circumference of the lens holder, stopper concave portions housing each of the stopper convex portions are formed on the frame correspondingly to the stopper convex portions, the stopper concave portion is provided with a concave bottom surface capable of being in surface contact with a first convex end surface of the stopper convex portion in the light axis direction and a concave side surface capable of being in surface contact with a convex side surface crossing the first convex end surface of the stopper convex portion, and a convex intersection corner between the first convex end surface and the convex side surface is provided with one of a chamfering portion and an R curved surface portion so as not to touch a concave intersection corner between the concave bottom surface and the concave side surface.

In the lens drive device according to the first aspect of the present invention, a chamfering portion or an R curved surface portion is formed at the convex intersection corner of the stopper convex portion. Thus, the convex intersection corner does not touch the concave intersection corner between the concave bottom surface and the concave side surface. Thus, even if a device including the lens drive device is dropped, the corner of the stopper convex portion does not collide with the concave portion of the frame, and thus the corner is hard to be chipped and hard to generate scrap. In the lens drive device according to the first aspect of the present invention, the collisions between the surfaces of the stopper convex portions and the surfaces of the stopper concave portions just occurs at the time of falling, and the breakage of the frame and the distortion of the lens holder due to a drop impact are hard to occur.

The frame may be provided with a magnet component constituting a part of the drive portion in the light axis direction, the magnet component may be attached to the frame so that a second convex end surface of the stopper convex portion positioned on an opposite side of the first convex end surface in the light axis direction can be in surface contact with an end surface of the magnet component in the light axis direction, and the stopper convex portion may be inserted in the stopper concave portion so as to be movable between the concave bottom surface and the magnet component in the light axis direction.

This configuration can effectively limit a movement range of the lens holder to the frame in the light axis direction without increase in the number of parts and contributes to downsizing of the device.

The frame may have a polygonal ring shape, and the stopper concave portions may be formed at positions of sides of the polygonal ring shape (e.g. rectangular ring shape). In this case, an IC chip or so can be arranged at the corner of the polygonal ring shape (e.g. rectangle).

The frame may be covered with a case, the stopper concave portion may be open in the light axis direction so that a second convex end surface of the stopper convex portion positioned on an opposite side of the first convex end surface in the light axis direction can be in surface contact with an inner surface of the case in the light axis direction, and the stopper convex portion may be inserted in the stopper concave portions so as to be movable between the concave bottom surface and the inner surface of the case in the light axis direction.

This configuration can effectively limit a movement range of the lens holder to the frame in the light axis direction without increase in the number of parts and contributes to downsizing of the device.

The frame may have a polygonal ring shape, and the stopper concave portions may be formed at positions of corners of the polygonal ring shape (e.g. rectangular ring shape). This configuration can effectively utilize the positions of the corners and contributes to downsizing of the device.

The stopper convex portion may be provided with a thick portion. The stopper convex portion has an increased strength by forming the thick portion.

The thick portion may be formed on the same side as the first convex end surface at a position not in contact with the frame. The thick portion may gradually become thicker in the light axis direction toward a center of the light axis. This configuration improves a reinforcement function.

The lens drive device according to a second aspect of the present invention is a lens drive device including:

a lens holder capable of holding at least one lens;

a frame arranged around the lens holder and holding the lens holder relatively movable along a light axis of the lens; and a drive portion in a light axis direction moving the lens holder relatively to the frame along the light axis, wherein at least three stopper convex portions protruding toward the frame are formed on an outer circumference of the lens holder, stopper concave portions housing each of the stopper convex portions are formed on the frame correspondingly to the stopper convex portions, the stopper concave portions is provided with a concave bottom surface capable of being in surface contact with a first convex end surface of the stopper convex portion in the light axis direction and a concave side surface capable of being in surface contact with a convex side surface crossing the first convex end surface of the stopper convex portion, and a concave intersection corner between the concave bottom surface and the concave side surface is provided with a relief portion so as not to touch a convex intersection corner between the first convex end surface and the convex side surface.

In the lens drive device according to the second aspect of the present invention, the relief portion is formed at the concave intersection corner of the stopper concave portion so as not to touch the convex intersection corner. Thus, even if a device including the lens drive device is dropped, the corner of the stopper convex portion does not collide with the concave portion of the frame, and thus the corner is hard to be chipped and hard to generate dust. In the lens drive device according to the second aspect of the present invention, the collisions between the surfaces of the stopper convex portions and the surfaces of the stopper concave portions just occur at the time of falling, and the breakage of the frame and the distortion of the lens holder due to a drop impact are hard to occur.

The lens drive device of the present invention may further include:

an elastic member configured to hold the lens holder relatively movable to the frame along the light axis of the lens;

a support portion connecting the elastic member and a fixed portion so that the frame is supported movably to the fixed portion along a direction crossing the light axis; and a drive portion in an intersection direction configured to move the frame to the fixed portion along the direction crossing the light axis.

The elastic member may include:

a holder attachment portion attached to the lens holder;

a frame attachment portion attached to the frame; and a support attachment portion attached to the support portion, and wherein a space may be formed between the frame and a part of the elastic member positioned between the frame attachment portion and the support attachment portion, and a vibration absorption member may be arranged in the space.

In the lens drive device with these configurations, the frame as a movable portion can be effectively prevented from vibrating in the light axis direction due to a cooperation effect of the elastic member and the vibration absorption member. As a result, it is possible to prevent generation of a resonance point (e.g. around 300 Hz) with frequency properties of AF driving. Thus, it is possible to effectively prevent deviation in focus even if a photographer moves particularly when taking moving images. Furthermore, resonance restraint effects are improved, and a resonance restraint effect in a blur correction direction is particularly improved. In addition, the space between a part of the elastic member and the frame functions as a reservoir for the vibration absorption member at the position where the vibration absorption member is arranged, and the vibration absorption member does not fall off from the space.

The vibration absorption member may be arranged away from the support attachment portion along an outer shape of the frame. In this configuration, the movable portion can be further effectively prevented from vibrating in the light axis direction.

For example, the frame may have an approximately rectangular ring shape, and the vibration absorption members may be arranged away from the support attachment portion at two or more points near each four corner of the frame along the outer shape of the frame. In this configuration, the frame as a movable portion can be further effectively prevented from vibrating in the light axis direction.

For example, the elastic members may be arranged at the four corners of the frame respectively in a separated and insulated manner. In this configuration, four conductive passages from the fixed portion to the lens holder can be formed by using the four support portions made of a conductive member and the four elastic members made of a conductive member.

For example, the frame may be provided with a notch so that the support attachment portion of the elastic member is arranged outside the frame. In this configuration, for example, it becomes easy to connect a tip of the support portion constituted by the suspension wire and the elastic member while maintaining a small size of the frame. The movement of the frame in the directions crossing the light axis can become smoother.

For example, the frame is provided with a first step surface recessed in the light axis direction for forming a space, and the vibration absorption member is arranged in the space between the first step surface and the elastic member. In this configuration, the vibration absorption member is filled easily, and the vibration absorption member once filled does not easily come off from the space.

For example, the case fixed to the fixed portion is arranged outside the frame, the frame is provided with a second step surface recessed in an approximately vertical direction to the light axis from an outer surface of the frame where the frame may touch an inner surface of the case due to a relative movement of the frame, and a contact surface of the frame touched by the vibration absorption member is arranged inner side of the second step surface.

In this configuration, since the contact surface of the frame touched by the vibration absorption member is arranged inner side of the second step surface, even if the frame moves to the directions crossing the light axis in the case and touches the inner circumferential surface of the case, the vibration absorption material does not touch the inner circumferential surface of the case, and the vibration absorption material hardly drops or is peeled off from a predetermined position toward the inner circumferential surface of the case.

For example, the vibration absorption member may be in contact with a second surface of the elastic member positioned on the opposite side of a first surface of the elastic member touched by the vibration absorption member arranged in the space. In this configuration, the elastic member touches the vibration absorption member from both surfaces of the first surface and the second surface, and vibration restraint effect is further enhanced.

For example, a through hole going through the first surface and the second surface is preferably formed at a part of the elastic member where the vibration absorption member touch both of the first and second surfaces. In this configuration, it becomes easy to fill the vibration absorption member via the through hole and further becomes easy to arrange the vibration absorption member on both surfaces of the elastic member.

For example, the support attachment portion formed on the elastic member may have a U shape recessed inward. In this configuration, for example, the tip of the support portion constituted by the suspension wire or so can be easily attached to the support attachment portion of the elastic member via the concave portion with U shape.

For example, the support attachment portion may be formed in an intersection between a pair of arm portions continued from the frame attachment portion, each of the arm portions may have a portion not in contact with the vibration absorption member, and in addition to the intersection of the arm portions, the elastic member may be provided with a bridge portion bridging the arm portions.

In this configuration, it is possible to disperse a stress concentrated on the arm portions into the bridge portion, improve strength of the support attachment portions, and effectively prevent the tip of the support portion constituted by the suspension wire or so from coming off the support attachment portion of the elastic member.

For example, the arm portions may have a portion where the elastic member becomes narrow in the middle of the arm portions from the frame attachment portion toward the support attachment portion. In this configuration, the support attachment portion has an improved elasticity and can effectively prevent the buckling of the support portion constituted by the suspension wire or so.

For example, the support attachment portion may be provided with a tongue portion, and the vibration absorption member may be arranged between at least a part of the tongue portion and the frame. In this configuration, resonance restraint effects are improved, and a resonance restraint effect in blur correction directions is particularly improved. The tongue portion may be configured by protruding from the support attachment portion toward the light axis. In this configuration, a part of the tongue portion touches the frame via the vibration absorption member without interfering with a part of the elastic member, and resonance restraint effect is improved.

BRIEF DESCRIPTION OF THE DRAWINGS

FIG. 1D is a partially enlarged schematic view showing a damper material filled between a back surface of a frame and a pedestal shown in FIG. 1C.

FIG. 1F is a partially perspective view showing a detail of a connection portion with a suspension wire of a front spring shown in FIG. 1B.

FIG. 1M is a partially perspective view showing a detail of a connection portion with a suspension wire of a front spring used for a lens drive device according to further another embodiment of the present invention.

FIG. 5A is a plane view where a circuit board and drive coils are arranged on a base portion shown in FIG. 2.

FIG. 5B is a plane view of first drive coils shown in FIG. 5A.

FIG. 5C is a plane view of second drive coils shown in FIG. 5A.

FIG. 7 is a cross sectional view along VII-VII line shown in FIG. 6B and is a cross sectional view where a frame and a lens holder are also combined in an upper part in the Z-axis direction of the partially assembled view shown in FIG. 6B.

DESCRIPTION OF THE PREFERRED EMBODIMENTS

Hereinafter, the present invention will be described based on embodiments shown in the figures.

First Embodiment

Figure 1A:
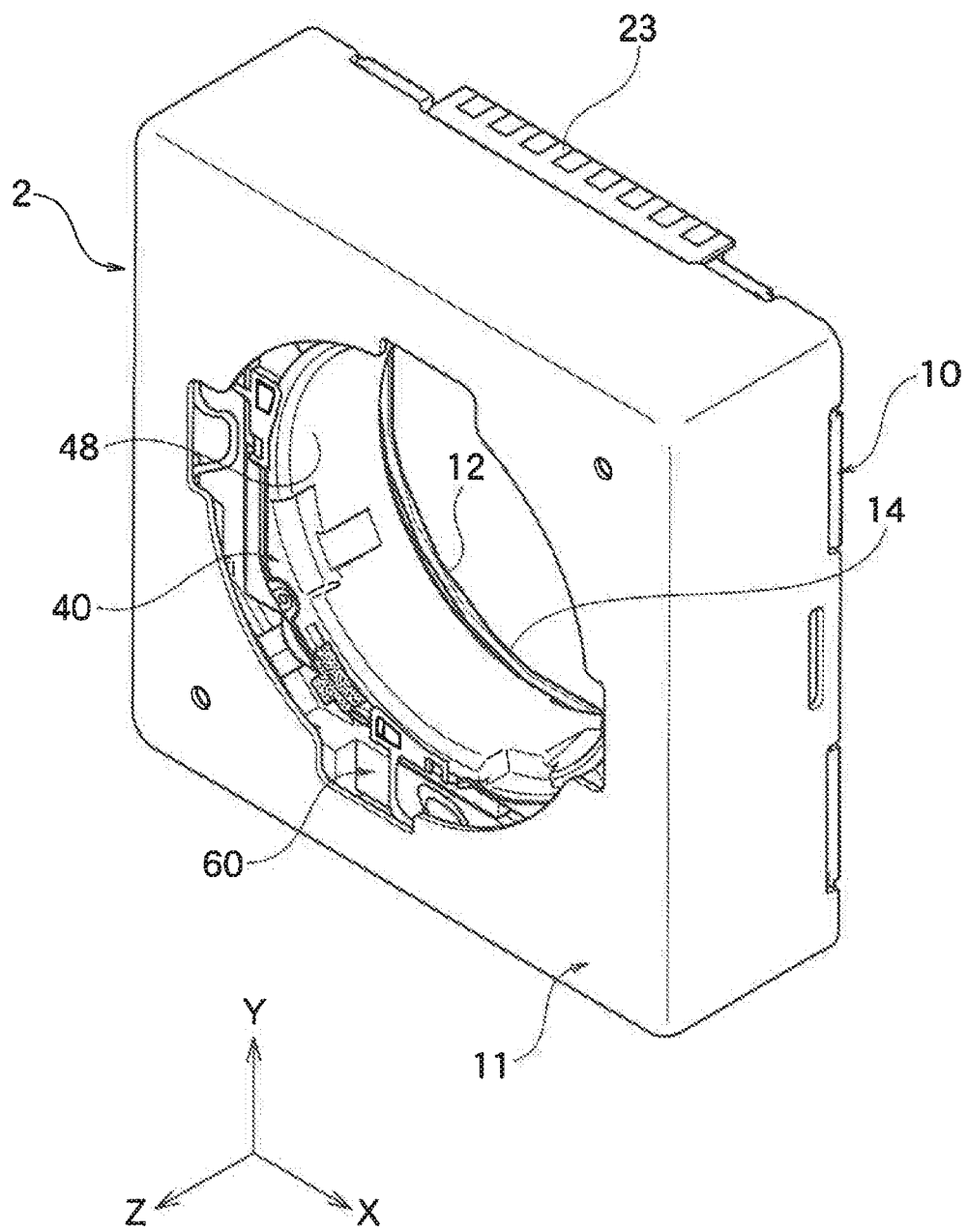
FIG. 1A is a whole perspective view of a lens drive device according to an embodiment of the present invention.
Figure 1B:
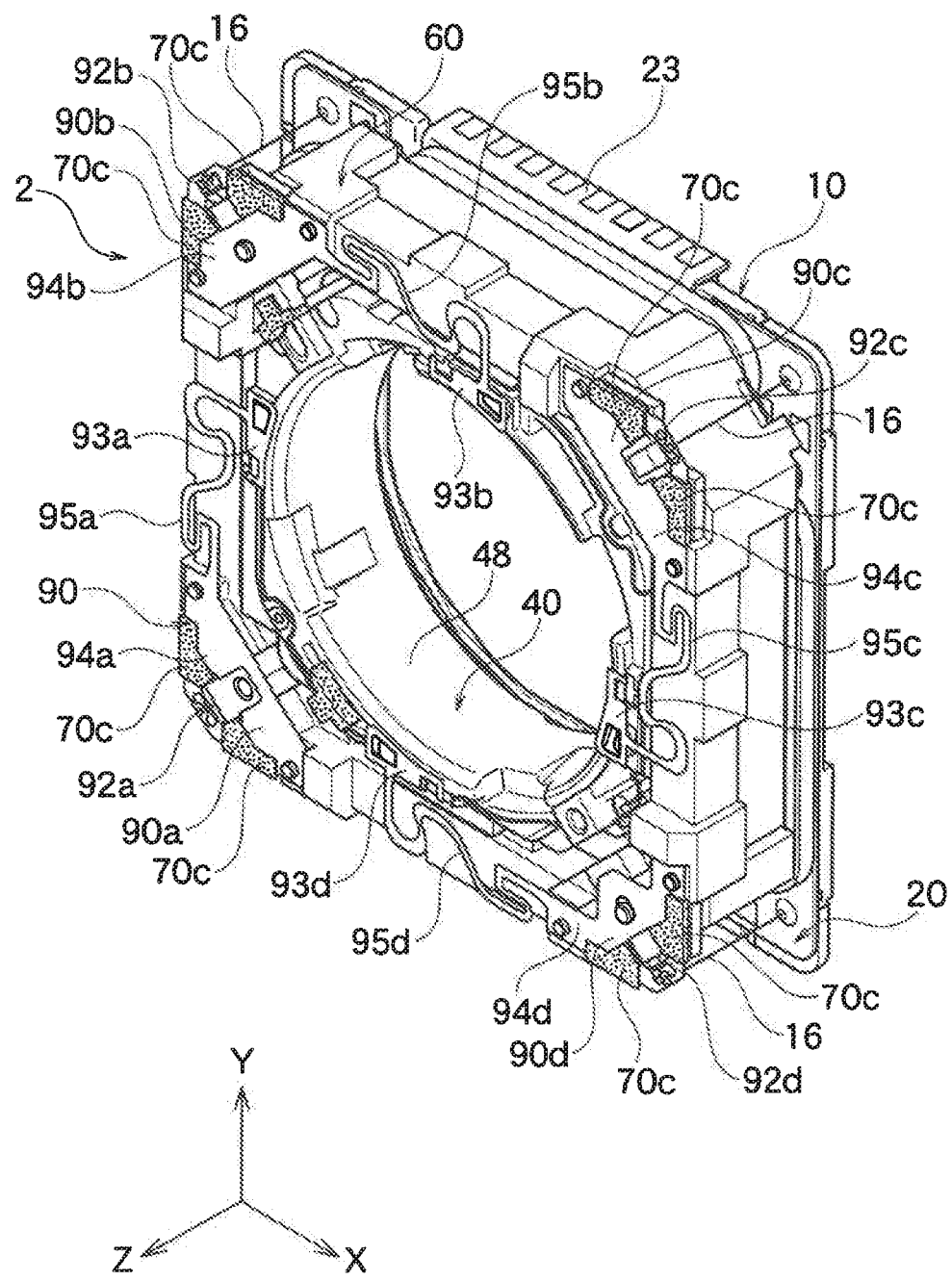
FIG. 1B is a whole perspective view showing the inside of the lens drive device without a case shown in FIG. 1A.
Figure 2:
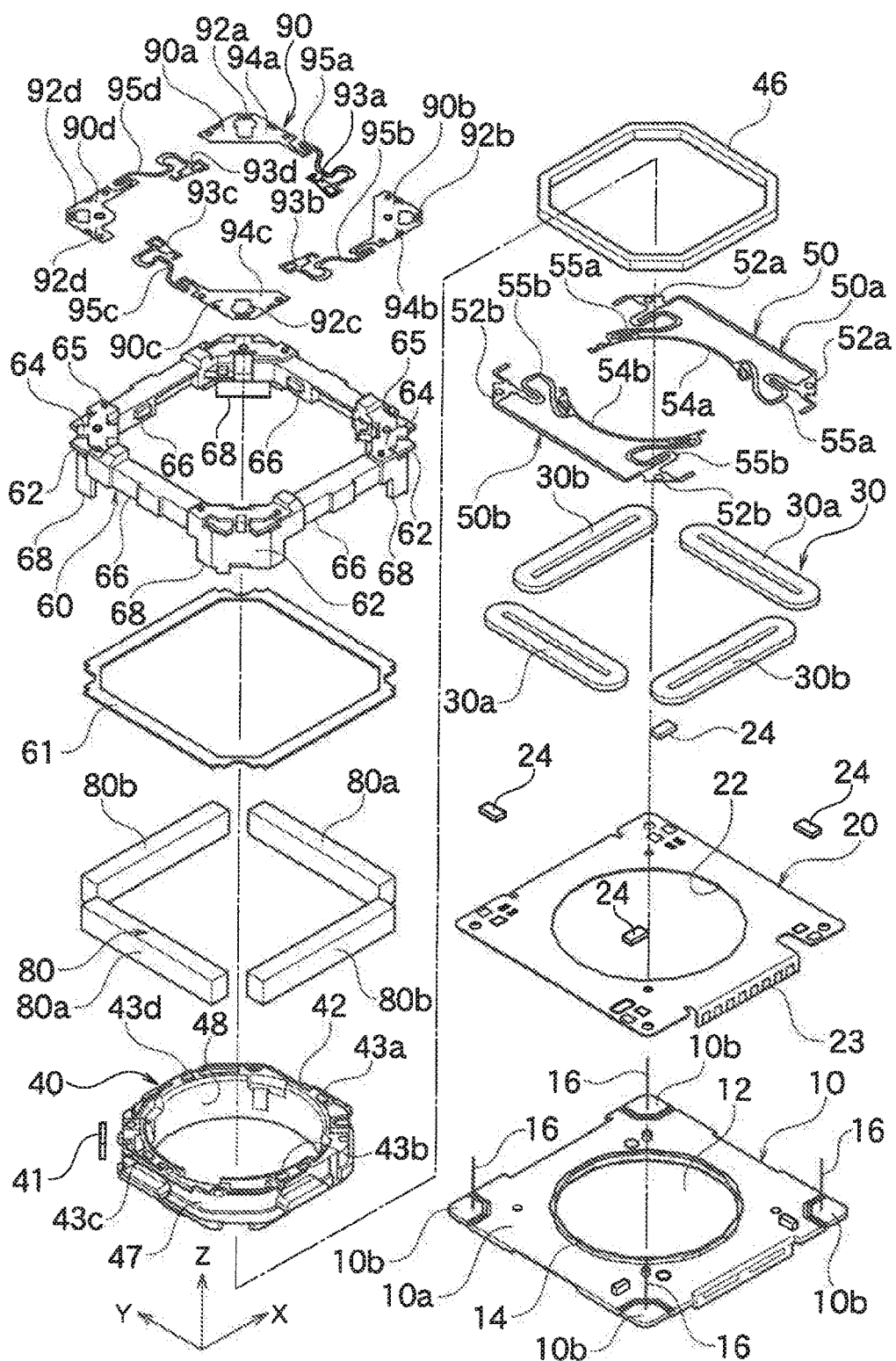
FIG. 2 is an exploded perspective view of the lens drive device without the case shown in FIG. 1A.

As shown in FIG. 1A, a lens drive device 2 according to an embodiment of the present invention has a base portion 10 and a case 11 as fixed portions. The base portion 10 and the case 11 are joined at a rear opening edge of the case 11 in the Z-axis direction. In the case 11, as shown in FIG. 1B and FIG. 2, a circuit board 20 constituted by a FPC or so, a lens holder 40, and a frame 60 are arranged toward the front of the base portion 10 in the Z-axis direction. The lens holder 40 and the frame 60 constitute a movable portion for blur correction to the fixed portion.

A central area of the circuit board 20 is provided with a board opening portion 22 going through front and back surfaces. The board opening portion 22 is inserted by a cylindrical convex portion 14 formed in a central area of the base portion 10. The cylindrical convex portion 14 constitute an opening edge of a base opening portion 12. The surface (front surface) of the circuit board 20 is equipped with a blur correction coil 30 along a periphery of the board opening portion 22. Incidentally, the circuit board 20 is integrated with the base portion 10 and constitute a part of the fixed portions.

As described below, the blur correction coil 30 has a pair of first drive coils 30a constituting a first drive axis and a pair of second drive coils 30b constituting a second drive axis approximately vertically crossing the first drive axis. The drive coils 30a and 30b are fixed to the surface of the circuit board 20 by an adhesive or so.

The circuit board 20 has a rectangular plate shape as a whole, and a side of outer shape of the rectangular shape is provided with a connector portion 23 for connection with an external circuit. Incidentally, all of the figures are explained with the Z-axis direction parallel to a light axis of a lens 100 (see FIG. 7) capable of being held on an inner circumferential surface 48 of the lens holder 40 and the X-axis and Y-axis directions vertical to the light axis (an example of crossing directions).

Incidentally, the X-axis, the Y-axis, and the Z-axis are vertical to each other. In the present embodiment, the X-axis corresponds to the first drive axis, and the Y-axis corresponds to the second drive axis. The front surface or the front side along the Z-axis represents an upward direction and represents an object side to the lens in FIG. 2 and FIG. 7. The back surface or the back side along the Z-axis represents a downward direction and represents an imaging element side to the lens in FIG. 2 and FIG. 7.

As shown in FIG. 2, the base portion 10 consists of a base plate main body 10a and wire rear edge attachment pieces 10b respectively attached to four corners of the base plate main body 10a. Each of the wire rear edge attachment pieces 10b is provided with a rear edge of single suspension wires 16. The suspension wires 16 as support portions respectively extend forward in the Z-axis direction (upper part of FIG. 2) from four corners of the base portion 10 by going through four corners of the circuit board 20.

Holder attachment portions 93a to 93d of a front spring 90 are attached and fixed to a front surface 42 of the lens holder 40 shown in FIG. 2. A sensor component 41 is attached to a part of a periphery of an outer circumferential surface 47 of the lens holder 40. For example, the sensor component 41 is constituted by a hall IC component that detects a relative movement to a hall element (hall magnet) and detects a relative position of the lens holder 40 to the frame 60 in the Z-axis direction. The inner surface of the frame 60 corresponding to the sensor component 41 is equipped with a hall magnet not illustrated.

In the present embodiment, the lens holder 40 is equipped with the sensor component 41, and it is thus possible to detect a position of the lens holder 40 to the frame 60 in the Z-axis direction accurately in real time and achieve an accurate and quick AF operation for driving the lens holder 40 in the Z-axis direction based on the detection results. Incidentally, in this control, the lens holder 40 is driven based on a detection signal of the sensor component 41 especially when the frame 60 resonates in the Z-axis direction, and thus the vibration may increase. In the present embodiment, such a situation can be effectively prevented by only a vibration absorption member 70c mentioned below (or cooperation function with 70b, or cooperation function with 70a).

As shown in FIG. 1B and FIG. 2, the front spring 90 as an elastic member consists of four board dividing plate springs 90a to 90d divided and insulated to each other. The dividing plate springs 90a to 90d have wire attachment portions (support attachment portions) 92a to 92d, respectively, to which front edges of the suspension wires 16 are attached. Each of the suspension wires 16 and the dividing plate springs 90a to 90d is constituted by a conductive material, such as a metal, and is electrically conductive.

Figure 4A:
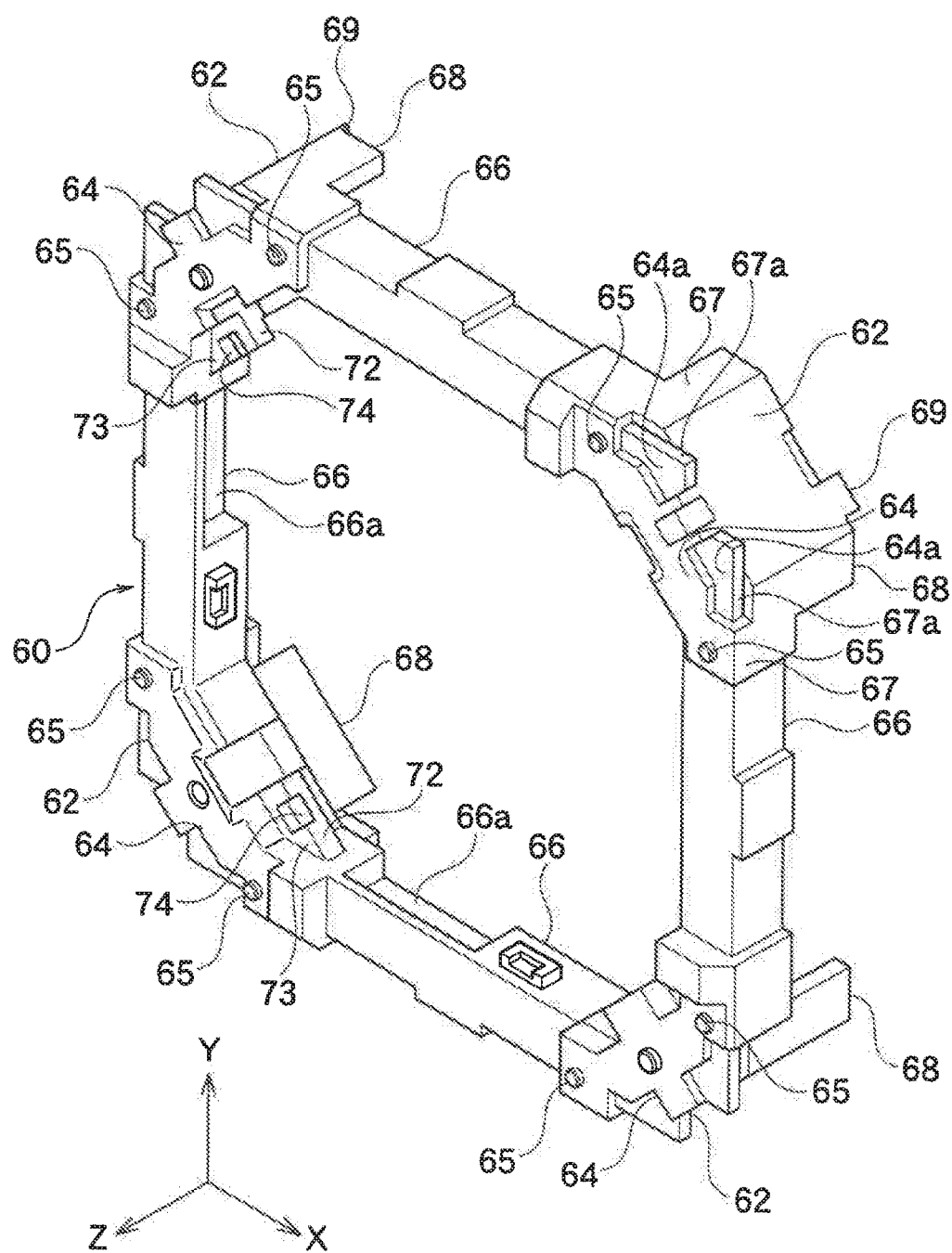
FIG. 4A is a perspective view of the frame shown in FIG. 2.

Each of the suspension wires 16 is freely bendable and elastically deformable along a driving plane including the X-axis and the Y-axis. Incidentally, the suspension wires 16 can be also elastically deformed in the Z-axis direction when received an excessive force, but in an ordinary lens driving operation, each of the suspension wires 16 is freely elastically deformed along the driving plane including the X-axis and the Y-axis. As shown in FIG. 4A, each of four corners of the frame 60 is provided with a notch 62 so that the rear edges of the suspension wires 16 are easily connected to each of the wire attachment portions 92a to 92d of the dividing plate springs 90a to 90d.

Each of the dividing plate springs 90a to 90d has frame attachment portions 94a to 94d continuously from the wire attachment portions 92a to 92d. For example, each of the frame attachment portions 94a to 94d is fixed by being attached to a front surface 64 of the frame 60 with a rectangular ring shape shown in FIG. 4A. The frame 60 itself is constituted by an insulation material, such as plastic.

As shown in FIG. 4A, the front surface 64 positioned at the corner of the frame 60 is preferably provided with a plurality of attachment convex portions 65. The attachment convex portions 65 are engaged with engagement holes formed on the frame attachment portions 94a to 94d of the dividing plate springs 90a to 90d shown in FIG. 1B and FIG. 2 so as to position the dividing plate springs 90a to 90d to the frame 60 and fix them. Back surfaces of each of the dividing plate springs' 90a to 90d are closely fixed to the front surfaces 64 positioned at the corners of the frame 60. When closely fixing the back surfaces, an adhesive may be used.

The frame attachment portions 94a to 94d of the dividing plate springs 90a to 90d are respectively provided with the holder attachment portions 93a to 93d via meandering portions 95a to 95d. Each of the holder attachment portions 93a to 93d is provided with an engagement hole, and this engagement hole is engaged with attachment convex portions 43a to 43d formed approximately uniformly around the front surface 42 of the lens holder 40 also shown in FIG. 3A.

That is, the meandering portions 95a to 95d are deformed elastically, and the front spring 90 holds the lens holder 40 movably to the frame 60 in the Z-axis direction of the light axis direction by the holder attachment portions 93a to 93d formed at an inner circumferential edge of the front spring 90.

The dividing plate springs 90a to 90d of the front spring 90 are separately connected to each of the suspension wires 16, and are connected to a wiring pattern formed on the front surface of the lens holder 40. Thus, a driving current is supplied to a focus coil 46 held in the lens holder 40 via the suspension wires 16 and the front spring 90, and a detection signal detected by the sensor component 41 can be transmitted to the circuit board 20. Each of the suspension wires 16 can be electrically connected to the wiring pattern on the circuit board 20. That is, four conductive passages from the circuit board 20 of the fixed portion to the lens holder 40 can be formed by using the four suspension wires 16 made of a conductive member and the four dividing plate springs 90a to 90d made of a conductive member.

Figure 3A:
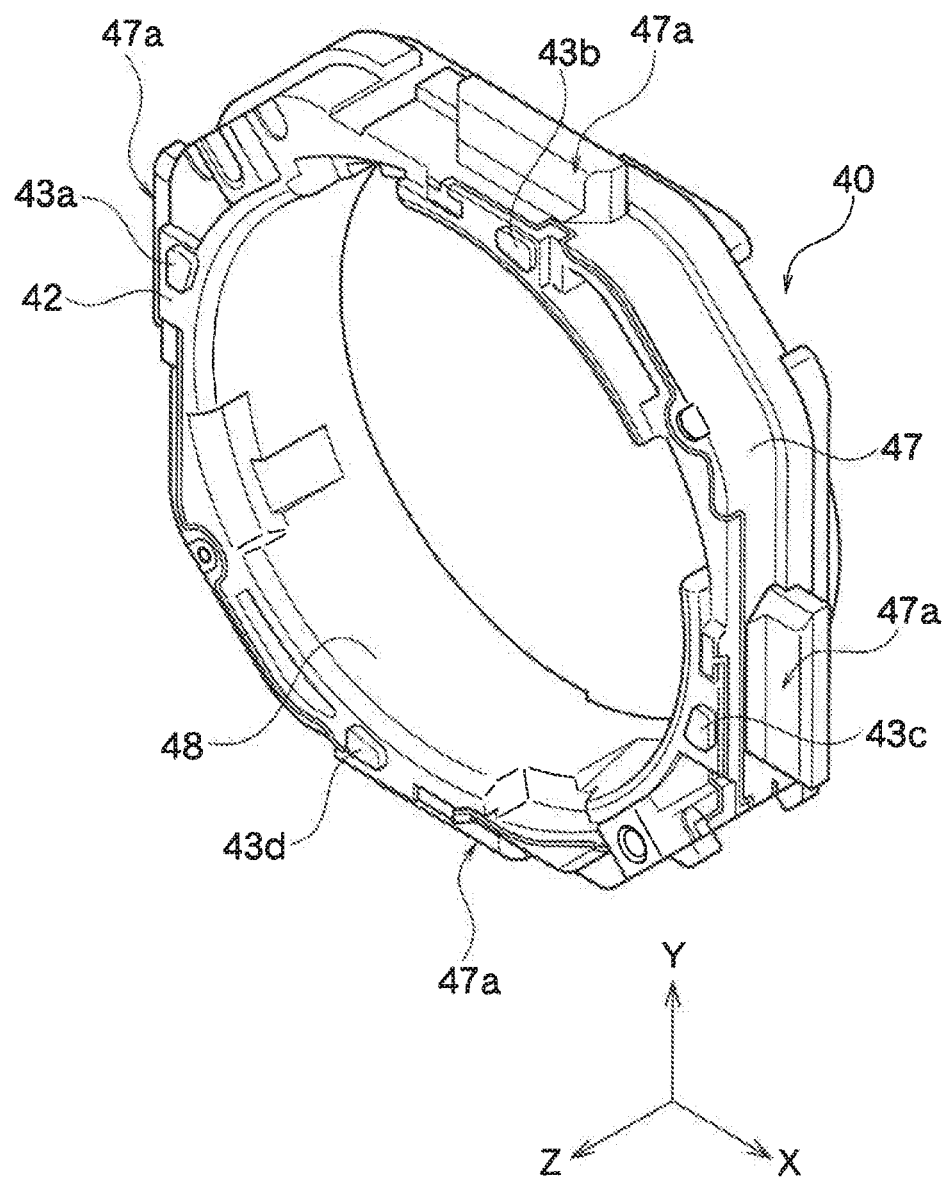
FIG. 3A is a perspective view of a lens holder shown in FIG. 2.
Figure 3B:
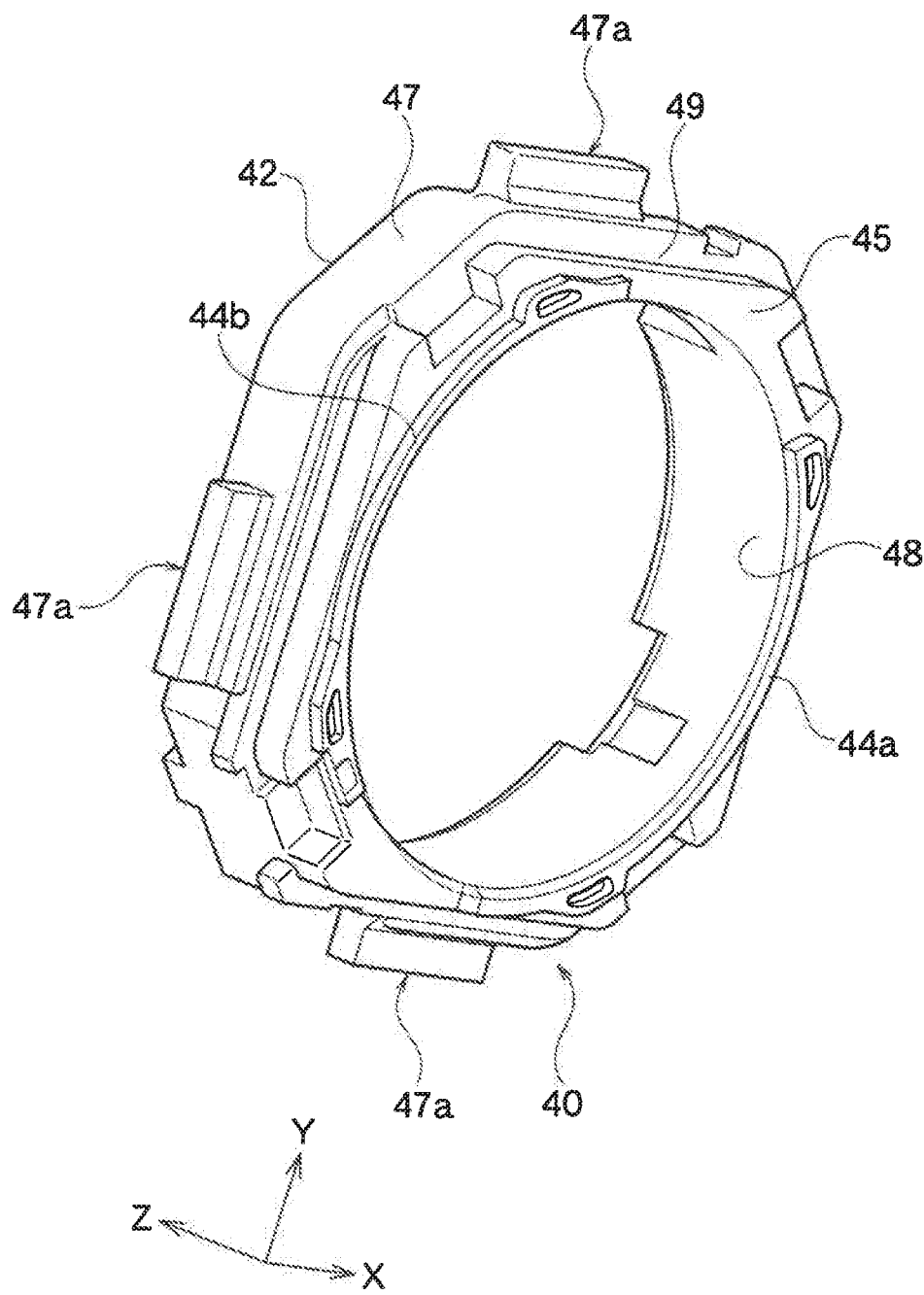
FIG. 3B is a perspective view of the lens holder shown in FIG. 3A seen from a different angle.

As shown in FIG. 3B, plate spring attachment portions 44a and 44b with circular shapes are formed on the back surface 45 of the lens holder 40. A step portion 49 is formed on the back side of the outer circumferential surface 47 of the lens holder 40. The focus coil 46 with a rectangular ring shape shown in FIG. 2 is fixed to the step portion 49.

As shown in FIG. 2, a rear spring 50 consists of a pair of dividing plate springs 50a and 50b. Holder attachment portions 54a and 54b with circular shapes are formed on inner circumferential portions of the dividing plate springs 50a and 50b. The holder attachment portions 54a and 54b are respectively fixed to the plate spring attachment portions 44a and 44b shown in FIG. 3B. The rear spring 50 is fixed to the plate spring attachment portions 44a and 44b by any means, such as engagement and adhesive.

As shown in FIG. 2, meandering portions 55a and 55b are formed continuously on both sides of the holder attachment portions 54a and 54b of the dividing plate springs 50a and 50b of the rear spring 50, and frame attachment portions 52a and 52b are formed continuously on the outer circumferential side of the meandering portions 55a and 55b. Each of the frame attachment portions 52a and 52b is fixed by being engaged with corner back surfaces 68 of the frame 60.

That is, as is the case with the front spring 90, the meandering portions 55a to 55d are deformed elastically, and the rear spring 50 holds the lens holder 40 movably to the frame 60 in the Z-axis direction of the light axis direction by the holder attachment portions 54a to 54d formed at an inner circumferential edge of the rear spring 50. Unlike the front spring 90, however, the rear spring 50 does not need to function as an electrically conductive passage.

Figure 4B:
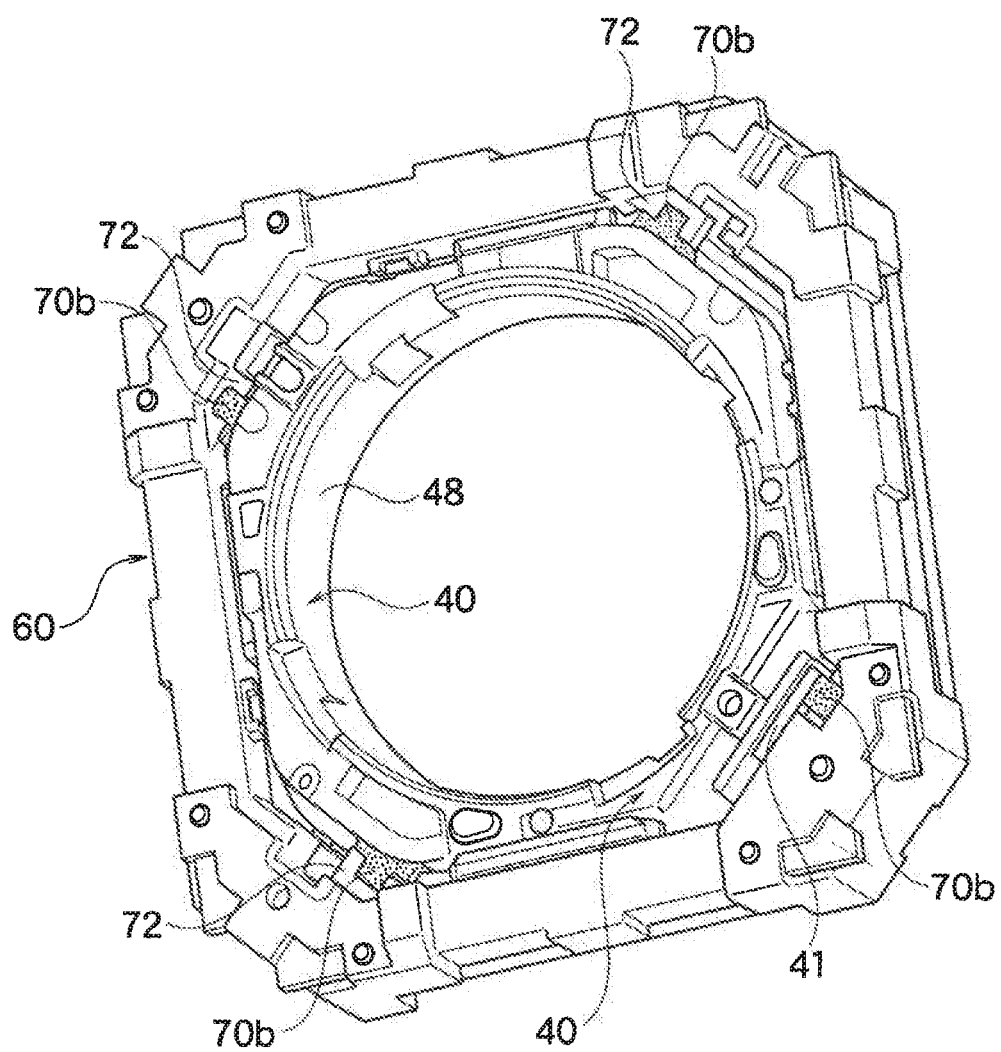
FIG. 4B is a perspective view of the frame shown in FIG. 4A seen from a different angle.

As shown in FIG. 4A and FIG. 4B, magnet attachment concave portions 66 are formed along four sides of the frame 60 with a rectangular ring shape on the rear side in the Z-axis direction. As shown in FIG. 2 and FIG. 7, a two-way magnet 80 is fixed in the magnet attachment concave portions 66 via a magnetic body plate 61. Incidentally, the magnetic body plate 61 constitutes a part of the magnet component including the magnet 80, but is not necessarily equipped. The magnet component may be constituted by only the magnet 80.

As shown in FIG. 7, the frame 60 is held in the base portion 10 by the suspension wires 16 so that a space (driving space) is formed between the back surface of the two-way magnet 80 and the front surface of the blur correction coil 30. The frame 60 is held movably to the base portion 10 along the driving plane including the X-axis and the Y-axis.

The lens holder 40 is held movably in the Z-axis direction in the frame 60 via the front spring 90 and the rear spring 50 shown in FIG. 2, and thus the lens holder 40 also moves with the frame 60 to the base portion 10 along the driving plane including the X-axis and the Y-axis.

A driving current flows through the blur correction coil 30 to apply a force in a vertical direction to the light axis to the two-way magnet 80 due to a cooperation effect of the coil 30 and the two-way magnet 80. Thus, along with the frame 60 and the lens holder 40, the frame 60 can move to the base portion 10 along the driving plane including the X-axis and the Y-axis. The lens 100 moves along the driving plane with the lens holder 40, and a blur correction operation can be carried out.

The lens holder 40 is held in the frame 60 via the springs 90 and 50 (see FIG. 2) so that a space is formed between the inner circumferential surface of the two-way magnet 80 and the outer circumferential surface of the focus coil 46. A driving current flows through the focus coil 46 to apply a force in the light axis to the coil 46 due to a cooperation effect of the coil 46 and the two-way magnet 80 (VCM effects). Thus, the lens holder 40 can move back and forward in the light axis direction with the lens 100. The lens 100 moves to the frame 60 in the light axis direction with the lens holder 40, and an automatic focus (AF) operation can be carried out.

In the present embodiment, the two-way magnet 80 functions as a magnet for AF control and a magnet for blur correction control, and it is thus possible to reduce the number of parts and carry out an AF control and a blur correction control with a simple configuration. Furthermore, the two-way magnet 80 contributes to downsizing of the lens drive device 2.

Incidentally, the lens 100 may be constituted by a plurality of lens groups, but is considered to be constituted by one lens for easy planation in the present embodiment.

Figure 6A:
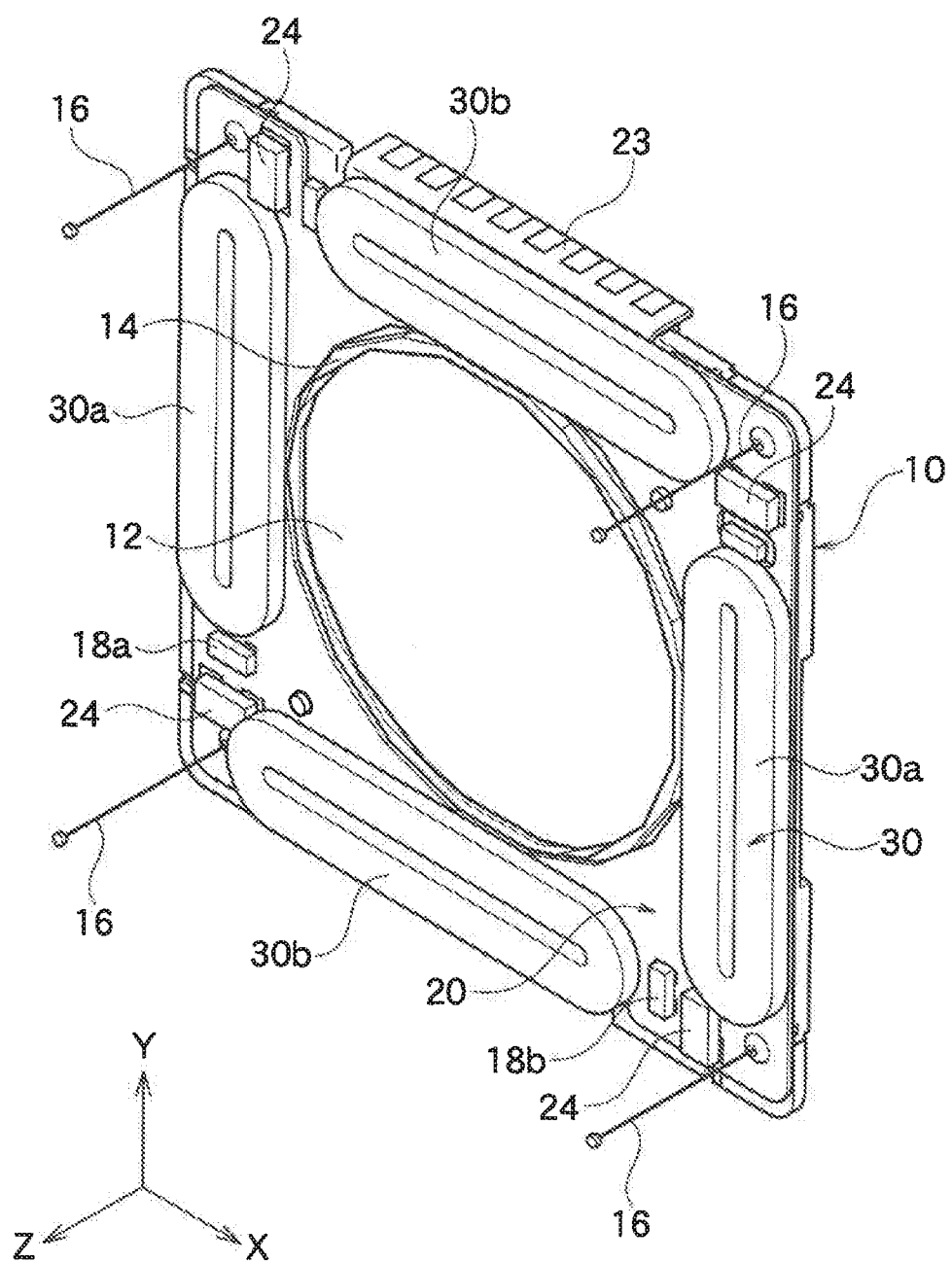
FIG. 6A is a perspective view of a partially assembled view where the circuit board and the drive coils are arranged on the base portion shown in FIG. 5A.
Figure 6B:
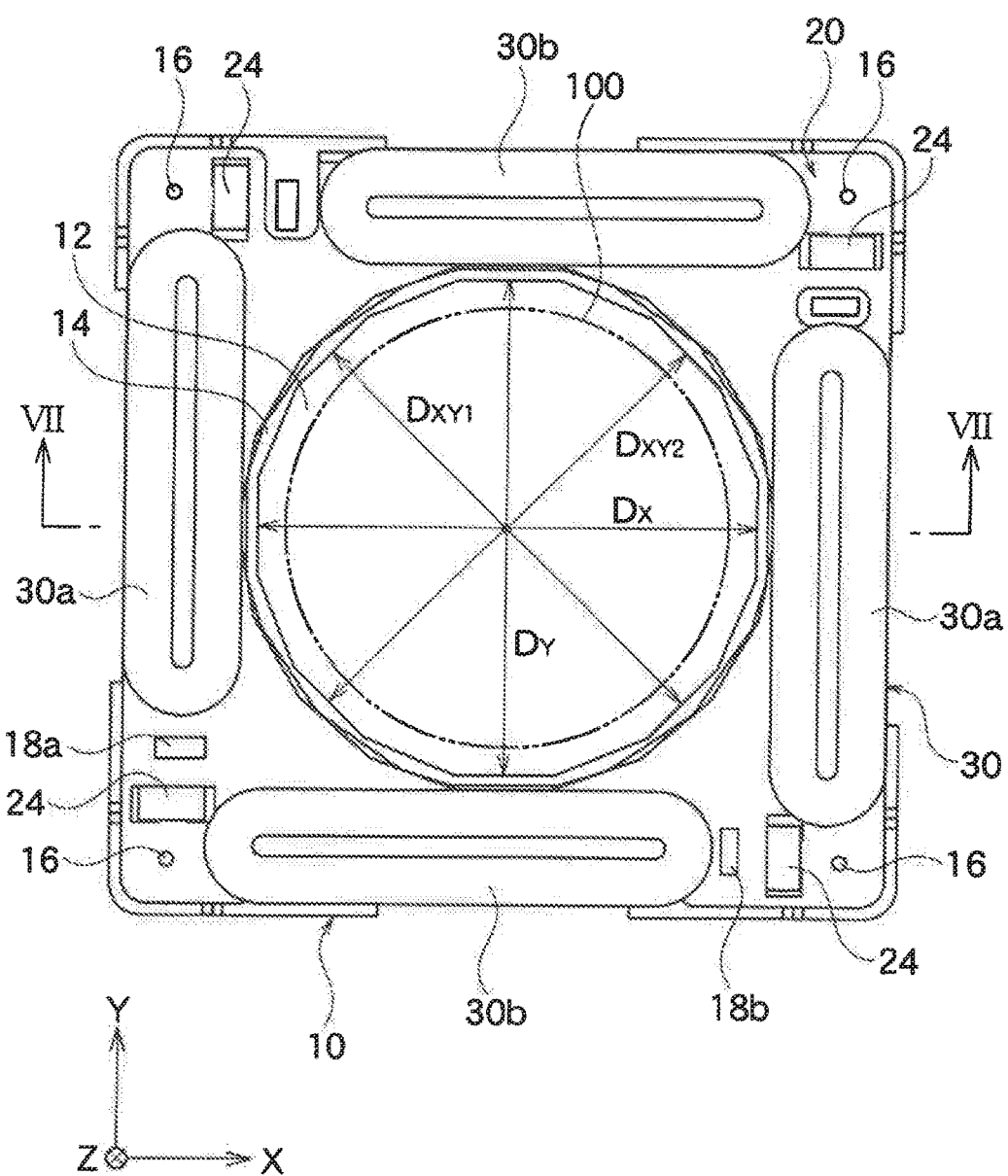
FIG. 6B is an enlarged plane view of FIG. 5A and shows a relation between a lens and an opening portion.

As shown in FIG. 6A and FIG. 6B, the blur correction coil 30 consists of a pair of the first drive coils 30a and 30a sandwiching the opening portion 12 along the X-axis direction and opposing to each other and a pair of the second drive coils 30b and 30b sandwiching the opening portion 12 along the Y-axis direction and opposing to each other. The drive coils 30a and 30b are arranged as a whole in parallel to each side of the circuit board 20 on the front surface of the circuit board 20 with a rectangular plate shape so as to surround the cylindrical convex portion 14.

The first drive coils 30a and 30a opposing to each other along the X-axis direction are slightly displaced in the Y-axis direction, and the second drive coils 30b and 30b opposing to each other along the Y-axis direction are also slightly displaced in the X-axis direction. The reason why the drive coils 30a and 30b are displaced along the circumferential direction in the same direction is that position sensors 18a and 18b, the damper stands (pedestals) 24, and the like, are easily arranged at the four corners of the circuit board 20, and that through holes of the suspension wires 16 are formed easily.

The position sensor 18*a* is constituted by a hall sensor, for example. The sensor 18*a* faces a back surface of one of first drive magnets 80*a* of the two-way magnet 80 shown in FIG. 2 with a predetermined space along with one of the first drive coils 30*a* and can detect a movement position of the first drive magnet 80*a* in the X-axis direction. The position sensor 18*b* is constituted by a hall sensor, for example. The sensor 18*b* faces a back surface of one of second drive magnets 80*b* of the two-way magnet 80 shown in FIG. 2 with a predetermined space along with one of the second drive coils 30*b* and can detect a movement position of the second drive magnet 80*b* in the Y-axis direction. The sensors 18*a* and 18*b* are electrically connected to the wiring pattern on the circuit board 20.

In the present embodiment, the first drive coils 30*a* and the first drive magnets 80*a* are arranged to face each other along the Z-axis direction with a predetermined space (driving space) and constitute a first drive portion (first VCM) for blur correction, and the second drive coils 30*b* and the second drive magnets 80*b* are arranged to face each other along the Z-axis direction with a predetermined space (driving space) and constitute a second drive portion (second VCM) for blur correction. The first drive axis of the first drive portion is the X-axis, and the second drive axis of the second drive portion is the Y-axis. The first drive portion and the second drive portion constitute a drive portion in an intersection direction.

The damper stands (pedestals) 24 shown in FIG. 6A and FIG. 6B are respectively fixed to the four corners of the circuit board 20 by a means of adhesive, brazing, or the like. The damper stands 24 are constituted by a chip component, such as a ceramic electronic component.

Figure 1C:
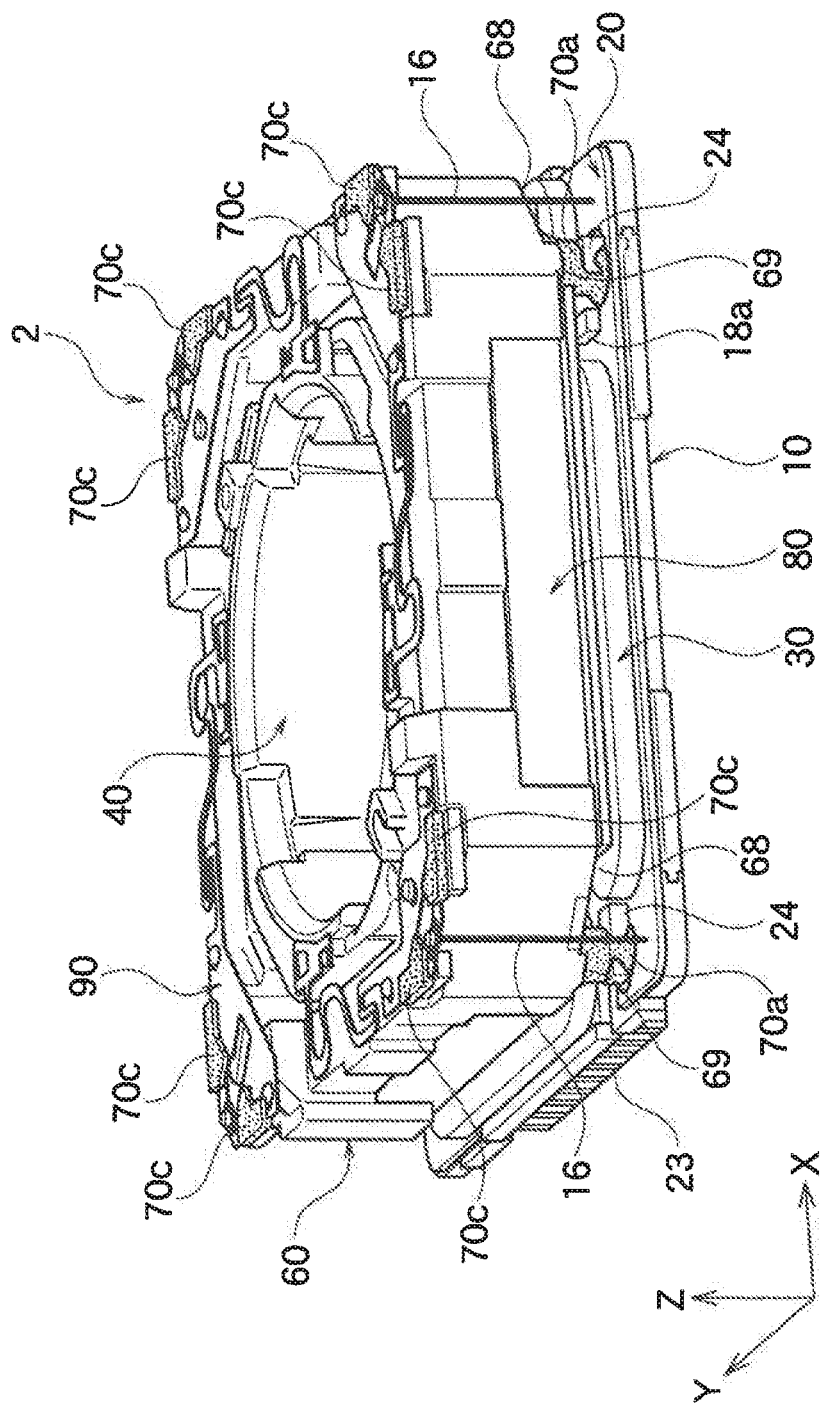
FIG. 1C is a whole perspective view of the lens drive device without the case shown in FIG. 1B seen from a different angle.

As shown in FIG. 1C and FIG. 1D, a space with space width W1 (first damper space) is formed between the front surface of the damper stand 24 and the corner back surface 68 or the back surface convex portion 69 of the frame 60, and a gel first damper material (vibration absorption member) 70*a* is interposed in the first damper space so as to closely touch both the front surface of the damper stand 24 and the corner back surface 68 or the back surface convex portion 69. The space width W1 is larger than a width W0 of the space between the two-way magnet 80 and the blur correction coil 30 (driving space), and is preferably about 0.1 to 0.4 mm.

The first damper material 70*a* is constituted by a vibration absorption material or so, such as a soft gel material and a soft adhesive. The first damper material 70*a* functions as a damper when the frame 60 moves to the base 10 and the circuit board 20 along the driving plane including the X-axis and the Y-axis, and is expected to restrain vibration. When the first damper material 70*a* is constituted by an UV curing resin or so, the first damper material 70*a* has a viscosity of 10 to 100 Pa·s, but has any viscosity.

Figure 1E:
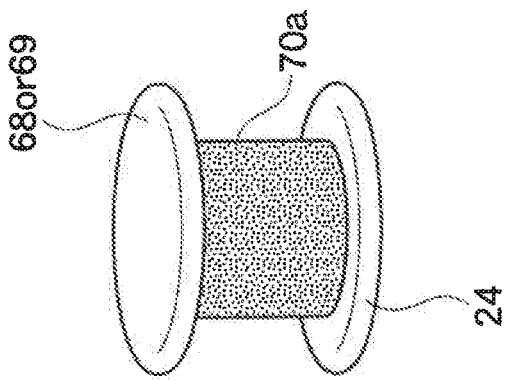
FIG. 1EA to FIG. 1EC are a partially enlarged schematic view showing a variation of a first damper material.
Figure 1E:
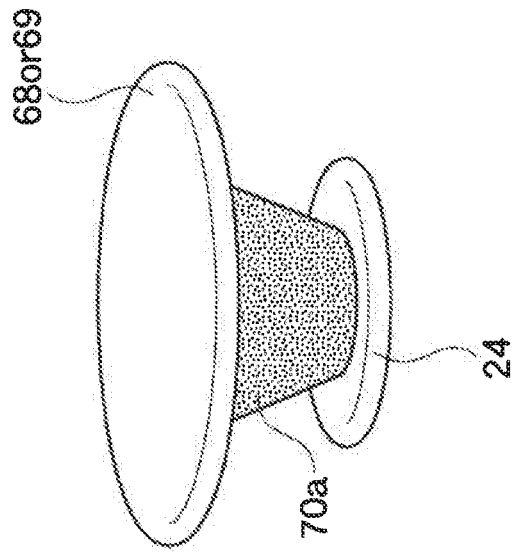
Figure 1E:
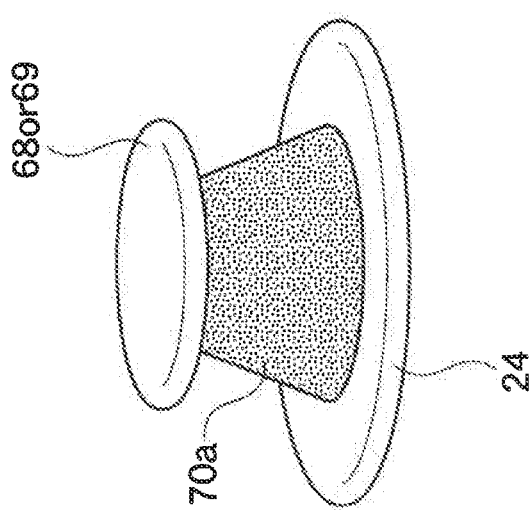

As shown in FIG. 1EA, in the present embodiment, a contact area of the first damper material 70*a* on the upper surface of the damper stand 24 is preferably larger than a contact area of the damper material 70*a* on the lower surface of the corner back surface 68 or the back surface convex portion 69 of the frame 60. As shown in FIG. 1EC, a contact area of the first damper material 70*a* on the upper surface of the damper stand 24 may be approximately equal to a contact area of the damper material 70*a* on the lower surface of the corner back surface 68 or the back surface convex portion 69 of the frame 60. As shown in FIG. 1EB, however, a contact area of the first damper material 70*a* on the upper surface of the damper stand 24 may be smaller than a contact area of the damper material 70*a* on the lower surface of the corner back surface 68 or the back surface convex portion 69 of the frame 60.

In the present embodiment, the first damper materials 70*a* are not arranged between the magnet 80 and the coil 30, but are arranged between the damper stands 24 and the corner back surfaces 68 of the frame 60, or are arranged between the damper stands 24 and the back surface convex portions 69 of the frame 60. In addition, the space width W1 is larger than W0. In the present embodiment, a stopper effect is thus applied by collision between the magnet 80 and the coil 30 even if an impact by the falling of a mobile device containing the lens drive device 2 is applied. It is thus possible to maintain a state where the first damper material 70*a* is held between the damper stand 24 and the corner back surface 68 of the frame 60 or between the damper stand 24 and the back surface convex portion 69 of the frame 60 and favorably maintain damper properties even after the impact.

Figure 4C:
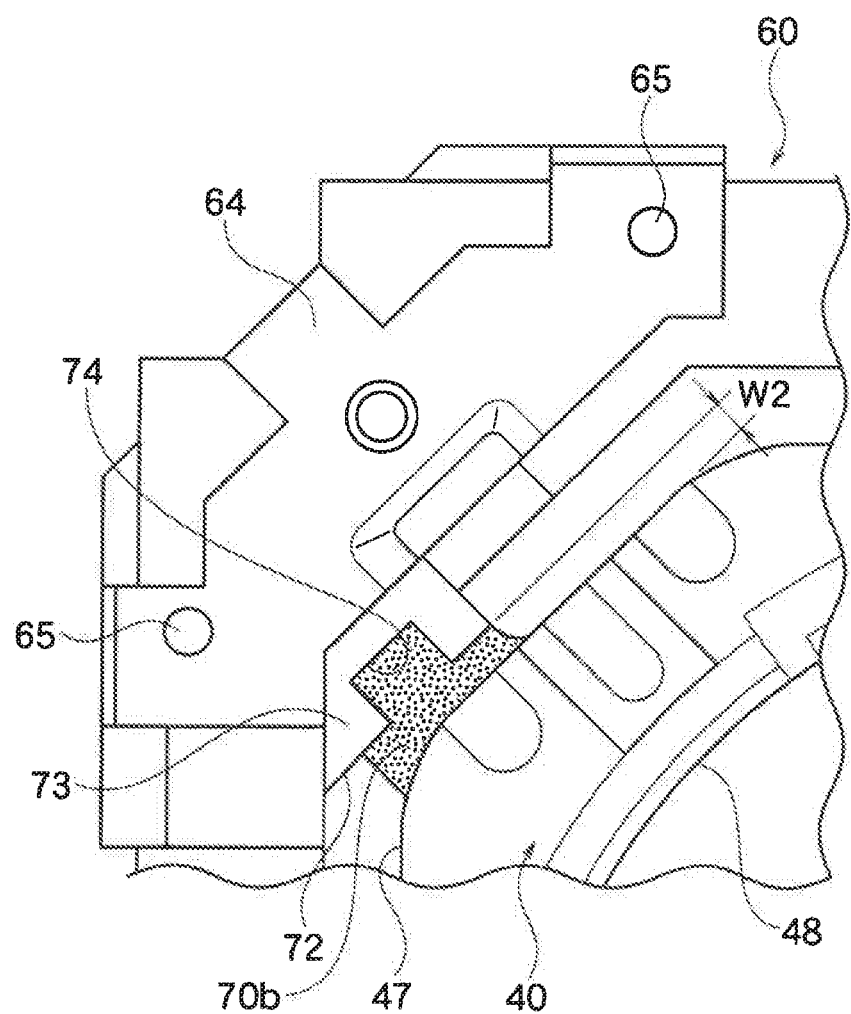
FIG. 4C is a perspective view where the frame and the lens holder shown FIG. 2 are combined.

In the present embodiment, as shown in FIG. 4A to FIG. 4E, an inner convex portion 72 protruding inward is formed on each inner side of the four corners of the frame 60. As shown in FIG. 4C, a width W2 of a space between the inner convex portion 72 and the outer circumferential surface 47 of the lens holder 40 is preferably 0.1 to 0.3 mm. The second damper material 70*b* is filled in the space with the width W2 (second damper space) and is closely in contact with the inner convex portion 72 and the outer circumferential surface 47 of the lens holder 40 in this space. The second damper material 70*b* is constituted by a similar material to that of the first damper material 70*a*, but is not necessarily constituted by the completely same material.

Figure 4D:
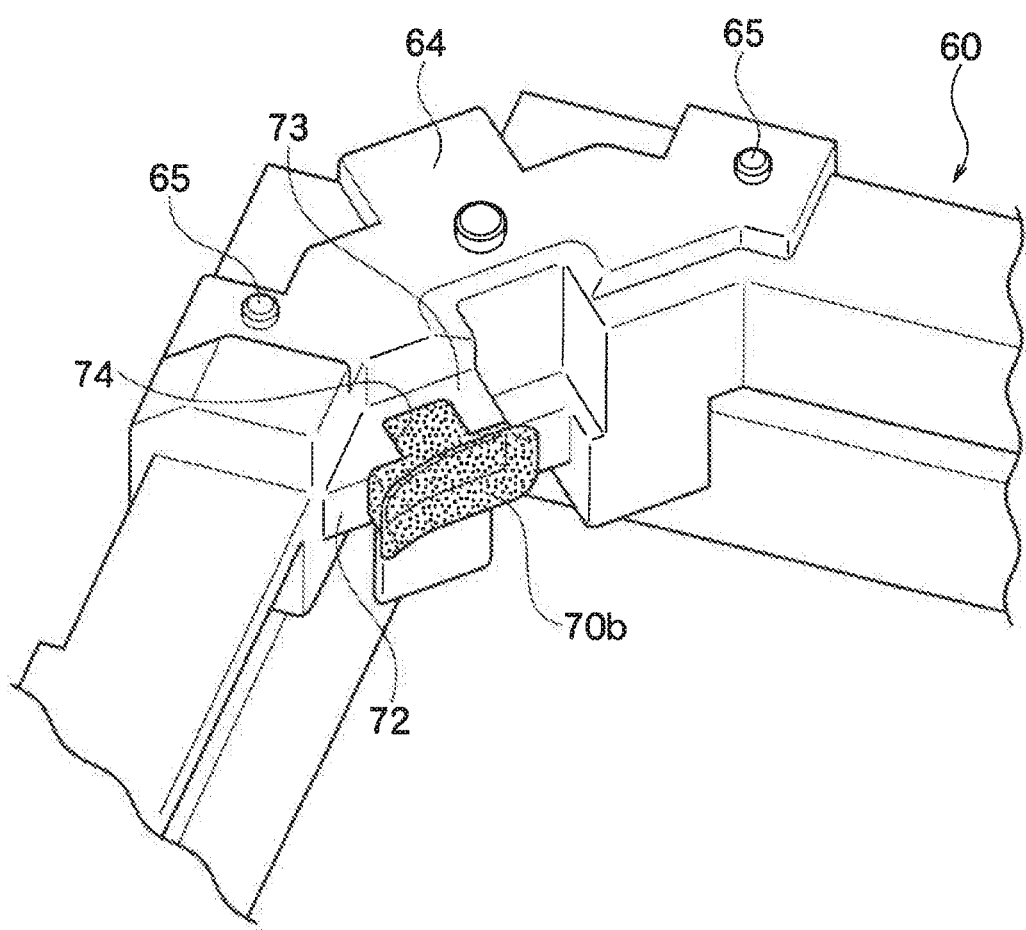
FIG. 4D is a partially enlarged view of main parts of the frame and the lens holder shown in FIG. 4C.
Figure 4E:
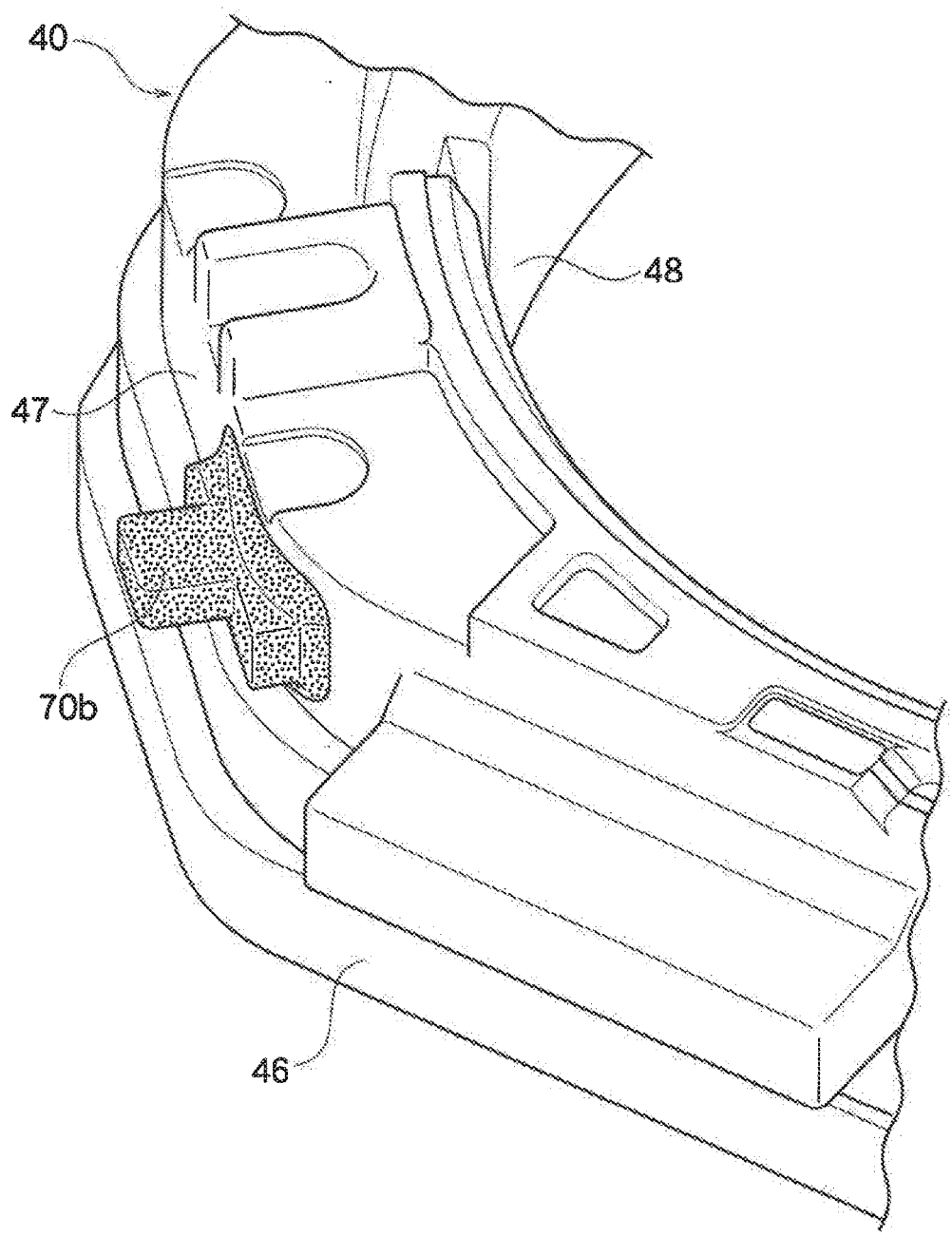
FIG. 4E is a partially enlarged view of a main part of only the frame shown in FIG. 4C.

As shown in FIG. 4D, a damper concave portion 74 is formed on the front surface 73 of the inner convex portion 72. The second damper material 70*b* is also filled in the damper concave portion 74 continuously from the space. That is why the damper concave portion 74 functions as a gel reservoir, and the second damper material 70*b* hardly falls off from the space even if an impact is applied to the lens drive device 2.

The second dumper materials 70*b* function as dampers when the lens holder 40 is driven for focus in the light axis direction (Z-axis direction) to the frame 60 and are expected to restrain vibration. In the present embodiment, the second damper materials 70*b* are arranged near the four corners of the rectangular frame 60, and thus the damper materials 70*b* at the four points can be arranged at the farthest positions from the central axis of the lens (light axis) and function as dampers at the maximum. Incidentally, as shown in FIG. 4C, one of the damper materials 70*b* at the four points may be arranged in a space between the sensor component 41 attached to a part of the outer circumferential surface of the lens holder 40 and the inner circumferential surface of the frame 60.

In the present embodiment, as shown in FIG. 6B, the base portion 10 is provided with the opening portion 12 inserted by a part of the lens 100 movably along the driving plane including the first drive axis (X-axis) and the second drive axis (Y-axis). In the present embodiment, oblique inner diameters Dxy1 and Dxy2 of the opening portion 12 in oblique directions positioned in the middles of the first drive axis (X-axis) and the second drive axis (Y-axis) are larger than a first inner diameter Dx of the opening portion 12 in the X-axis direction and are larger than a second inner diameter Dy of the opening portion 12 in the Y-axis direction.

In the present embodiment, the first inner diameter Dx and the second inner diameter Dy are approximately equal to each other. The oblique inner diameter Dxy1 and the oblique inner diameter Dxy2 are approximately equal to each other. The oblique inner diameters Dxy1 and Dxy2 become largest near bisectors of an intersection angle between a line along the first inner diameter Dx and a line along the second inner diameter Dy, and approximate to the first inner diameter Dx or the second inner diameter Dy when approaching the line along the first inner diameter Dx or the second inner diameter Dy.

In the present embodiment, the opening portion 12 has a polygonal shape of n-polygon, for example, and the oblique inner diameters Dxy1 and Dxy2 have largest values within a range of 45 degrees (half of the intersection angle between the X-axis and the Y-axis)±(360/n) degrees to the X-axis and the Y-axis. Incidentally, the shape of the inner circumferential surface of the opening portion 12 is not limited to polygon and may be a curved surface shape. In this case, the oblique inner diameters Dxy1 and Dxy2 have largest values within a range of 45 degrees (half of the intersection angle between the X-axis and the Y-axis)±15 degrees.

The inner diameter of the opening portion 12 changes step by step or continuously from the positions having largest values of the oblique inner diameters Dxy1 and Dxy2 toward the first inner diameter Dx or the second inner diameter Dy, but may change from largest values of the oblique inner diameters Dxy1 and Dxy2 toward the first inner diameter Dx or the second inner diameter Dy in a monotonously decreasing manner or in a repeatedly increasing and decreasing manner to approximate to the first inner diameter Dx or the second inner diameter Dy. Preferably, the oblique inner diameters Dxy1 and Dxy2 have a largest value that is 1.02 to 1.05 times larger than the first inner diameter Dx or the second inner diameter Dy.

In the lens drive device 2 according to the present embodiment, as shown in FIG. 6B, the oblique inner diameters Dxy1 and Dxy2 of the opening portion 12 in the oblique directions positioned in the middles of the X-axis and the Y-axis are larger than the first inner diameter Dx of the opening portion 12 in the X-axis direction and are larger than the second inner diameter Dy of the opening portion 12 in the Y-axis direction. This configuration eliminates a risk of collision between the lens 10 and the inner circumferential surface of the cylindrical convex portion 14 constituting the opening edge of the opening portion 12 not only when the lens 100 moves in the X-axis direction or the Y-axis direction but when the lens 100 moves in the middle of the oblique directions between the X-axis direction and the Y-axis direction.

Furthermore, in the lens drive device 2 according to the present embodiment, the opening portion 12 formed in the base portion 10 does not have a perfect circle shape, but has a deformed shape where the inner diameters Dxy1 and Dxy2 in the oblique directions positioned in the middles of the X-axis direction and the Y-axis direction are larger than the inner diameter of the X-axis direction or the Y-axis direction. This makes it possible to have a small outer shape of the base portion 10 compared to an opening portion of a perfect circle based on maximum movement amounts to the oblique directions, and contributes to downsizing of the device. In particular, as shown in FIG. 6B, there are rooms in the oblique directions crossing the X-axis and the Y-axis, and there is no need to broaden the outer shapes of the base portion 10 and the circuit board 20 even if the inner diameters of the opening portion 12 are increased in those directions.

When the base portion 10 and the circuit board 20 have the same outer shape, the present invention can broaden the base portion 10 excluding the opening portion 12 along the X-axis and the Y-axis compared to an opening portion of a perfect circle based on maximum movement amounts to the oblique directions. Thus, it is possible to increase the winding numbers of the first drive coil 30a and the second drive coil 30b and improve a driving force and an accuracy of blur correction.

Furthermore, in the present embodiment, the first drive portion includes a pair of the first drive coils 30a positioned on both sides of the opening portion 12 along the X-axis direction and sandwiching it, and the pair of the first drive coils 30a is arranged in parallel to two sides of the base portion 10 opposing to each other. This configuration improves a driving force along the X-axis direction and improves an accuracy of blur correction.

Furthermore, in the present embodiment, the second drive portion includes a pair of the second drive coils 30b positioned on both sides of the opening portion 12 along the Y-axis direction and sandwiching it, and the pair of the second drive coils 30b is arranged in parallel to two sides of the base portion 10 opposing to each other. This configuration improves a driving force along the Y-axis direction and improves an accuracy of blur correction.

Furthermore, the frame 60 has a rectangular ring shape as a whole as shown in FIG. 4A and is arranged inside the case 11 with a rectangular cylindrical shape fixed to the base 10 as shown in FIG. 1, and the oblique directions approximately correspond to diagonal line directions of the rectangular ring shape. As shown in FIG. 6B, this configuration makes it possible to efficiently arrange the first drive coils 30a and the second drive coils 30b on the base portion 10 excluding the opening portion 12 and decrease the outer shape of the base portion 10, and the device 2 is downsized easily.

Furthermore, in the present embodiment, as shown in FIG. 6B, the cylindrical convex portion 14 is formed along the opening edge of the opening portion 12 on the base portion 10, and the first drive coils 30a and the second drive coils 30b are arranged around the cylindrical convex portion 14. This configuration makes it possible to effectively prevent the lens 100 from colliding against the first drive coils 30a and the second drive coils 30b arranged around the cylindrical convex portion 14.

Dust on the surfaces of the base portion 10 and the circuit board 20 becomes hard to enter the opening portion 12 due to the presence of the cylindrical convex portion 14. The lens 100 goes through the opening portion 12, and an image element or so is arranged at the rear position of the lens 100 in the light axis direction. If dust adheres to the image element, the quality of images to be photographed may decrease, and the opening portion 12 is preferably not entered by dust.

Furthermore, as shown in FIG. 5A to FIG. 5C, a wire 32a communicating the pair of the first drive coils 30a and a wire 32b communicating the pair of the second drive coils 30b can be easily arranged along the outer circumferential surface of the cylindrical convex portion 14 due to the cylindrical convex portion 14. Lead wires 34a and 34b of each drive coil 30a and 30b are easily connected to the circuit pattern on the circuit board 20 by effectively utilizing the corner spaces between the cylindrical convex portion 14 and each of the drive coils 30a and 30b.

In particular, in the lens drive device 2 according to the present embodiment, the coils are not imbedded in the coil substrate, but the first drive coils 30a and the second drive coils 30b are fixed to the front surface as the fixed portion. Thus, the winding numbers of the drive coils 30a and 30b are easily increased, and the drive coils 30a and 30b can have increased driving forces.

Furthermore, in the lens drive device according to the present embodiment, the dumper stands 24 as pedestals are arranged on the front surface of the circuit board 20 as fixed portions, and the first dumper materials 70a as vibration absorption members are filled in the first dumper spaces between the dumper stands 24 and the corner back surfaces 68 of the frame 60 as a movable portion for blur correction.

Thus, the first dumper materials 70a become hard to fall off compared to a case where the first dumper materials 70a are directly filled on the front surface of the circuit board 20 as the fixed portion. As a result, dumper properties are improved, vibration or so can be prevented effectively, and blur correction function is improved. Thus, it is possible to prevent the frame 60 as the movable portion for blur correction from resonating in the vertical directions to the light axis against the circuit board 20 and the base portion 10 as the fixed portions and effectively prevent the frame 60 from resonating particularly in the light axis direction.

Since the dumper stands 24 as pedestals are arranged on the front surface of the circuit board 20 as the fixed portion, controlling the areas of the front surfaces of the dumper stands 24 makes it easy to determine a coating amount of a gel material to be the first dumper materials 70a and makes it possible to easily form a required amount of the first dumper materials 70a. Furthermore, when an impact force is applied at the time of fall, since the first dumper spaces are larger than the driving space, stopper effect functions by the collision between the drive coils 30a and 30b and the drive magnets 80a and 80b, and the first dumper spaces do not disappear. Thus, the first dumper materials 70a do not completely protrude from the first dumper spaces.

Furthermore, as shown in FIG. 1D, the heights of the first drive coils 30a and the second drive coils 30b in the Z-axis direction from the front surface of the circuit board 20 as the fixed portion are larger than the height of the dumper stands 24 in the Z-axis direction. The dumper stands 24 are lower than the drive coil 30, and the first dumper spaces can be thus sufficiently larger than the driving space.

The frame 60 can be constituted by plastic or so, and it is easy to control the contact surfaces with the first dumper materials 70a and control a filling amount of the first dumper materials 70a.

Furthermore, the dumper stands 24 are respectively fixed to the positions of the four corners on the upper surface of the circuit board 20 with a rectangular plate shape. Thus, the first dumper materials 70a can be arranged by effectively utilizing the four spaces vacant in the front surface of the fixed portion circuit 20. The first dumper materials 70a are arranged diagonally, and the distances among the first dumper materials 70a can be thus increased to the maximum. As a result, it is possible to effectively prevent a resonance in a direction of a tilt movement of the frame 60 as a movable portion for blur correction against the circuit board 20 and the base portion 10 as fixed members.

The dumper stands 24 can be constituted by a chip component, such as a ceramic electronic component. In case of a chip component, a terminal (external) electrode is formed, and the chip component is easily connected or joined to the fixed portion such as the circuit board. The chip component has an uneven surface and an excellent joining force with a vibration absorption member, and can further effectively prevent the vibration absorption member from falling off from a pedestal. Incidentally, the vibration absorption member may be attached to not only the front surface of the pedestal but the side surface thereof.

In particular, in the lens drive device 2 according to the present embodiment, the second dumper 70b is filled at least at one point along the circumferential direction in the space between the outer circumferential surface of the lens holder 40 and the inner circumferential surface of the frame 60. Thus, the lens holder 40 can be effectively restrained from resonating with the frame 60. As a result, the lens holder 40 does not resonate with the frame 60 at the time of blur correction operation and automatic focus operation, especially at the time of automatic focus operation, and these operations can be carried out favorably.

Furthermore, in the lens drive device 2 according to the present embodiment, the second dumper materials 70b are filled near the four corners of the frame 60 in the space between the outer circumferential surface of the lens holder 40 and the inner circumferential surface of the frame 60, and the concave portions 74 are respectively formed near the corners. In this configuration, the second dumper materials 70b can be arranged by effectively utilizing the spaces vacant in the inner circumferential surface of the frame 60, and a resonance in a direction of a tilt movement of the lens holder 40 against the frame 60 can be prevented further effectively due to the diagonal arrangement of the second dumper materials 70b.

The concave portions 74 opening toward the spaces are formed at positions where the second dumper materials 70 are filled on the inner circumferential surface of the frame 60. Thus, the concave portions 74 function as reservoirs for the second dumper materials 70b, and the second dumper materials 70b do not fall off from the spaces even if the lens holder 40 moves largely against the frame 60 in the light axis direction or the vertical directions to the light axis. In particular, the second dumper materials 70b do not fall off from the spaces even if the lens holder 40 moves largely against the frame 60 in the light axis direction or the vertical directions to the light axis due to the impact at the time of falling.

As shown in FIG. 4D, there is a room in the inner circumferential surface of the corner of the frame 60, and it is easy to arrange the inner convex portion 72 and form the concave portion 74 on the front surface 73 of the inner convex portion 72. A gel material to be the second dumper material 70b is injected easily into the concave portion 74, and working property is improved. Incidentally, the concave portion 74 may be formed on the outer circumferential surface of the lens holder 40, or may be formed on both the inner circumferential surface of the frame 60 and the outer circumferential surface of the lens holder 40.

Figure 1G:
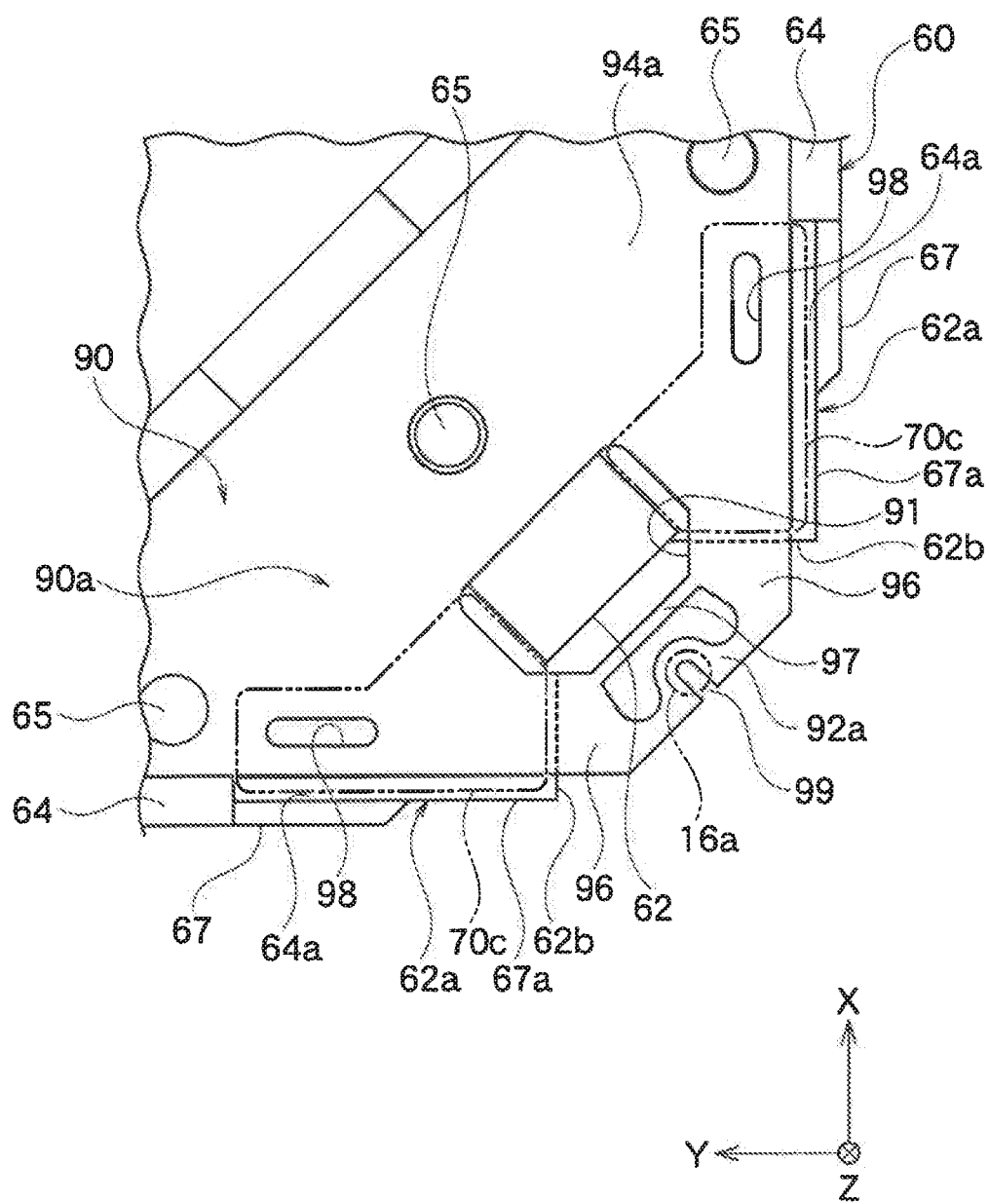
FIG. 1G is a partially plane view showing a detail of the connection portion with the suspension wire of the front spring shown in FIG. 1F.
Figure 1H:
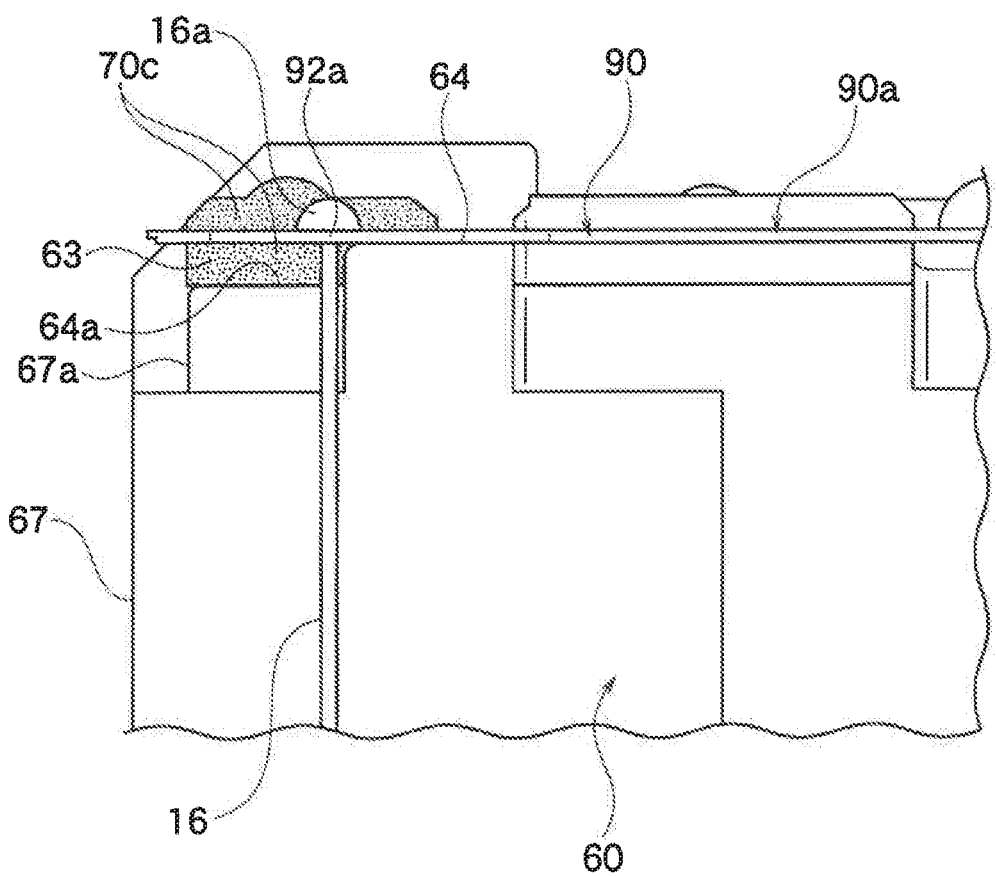
FIG. 1H is a partially side view showing a detail of the connection portion with the suspension wire of the front spring shown in FIG. 1F.

In the present embodiment, as shown in FIG. 1F to FIG. 1H, first step surfaces 64a recessed in the light axis (Z-axis) are formed on the front surface 64 of the frame 60 so that the spaces 63 are formed between the frame 60 and apart of the dividing plate spring 90a with flat plate shape positioned between the frame attachment portion 94a and the wire attachment portion 92a. The first step surfaces 64a are formed on front surfaces of a pair of step convex portions 62a at each corner of the frame 60 and are positioned on both sides of the wire attachment portion 92a. The step convex portions 62a are formed by protruding toward the X and Y axis directions at the front (upper) side of the notch 62 in the Z-axis direction, and each of the step convex portion 62a is provided with a notch 62b that is smaller than the notch 62. The wire attachment portion 94a is positioned on the notches 62b.

Incidentally, FIG. 1F to FIG. 1H illustrate one dividing plate spring 90a as an example, but the other dividing plate springs 90b to 90d shown in FIG. 2 have similar structures and thus are not illustrated or explained. The first step surfaces 64 are also shown in FIG. 4A.

As shown in FIG. 1A, the case 11 is arranged outside the frame 60. An outer circumferential surface 67 of the frame 60 shown in FIG. 1F to FIG. 1H may touch the inner surface of the case 11 shown in FIG. 1A due to a relative movement of the frame 60 to the X-Y axis directions. In the present embodiment, each corner of the frame 60 is provided with a pair of second step surfaces 67a recessed from the outer circumferential surface 67 of the frame 60 toward the X-axis and Y-axis directions and adjacent to the respective first step surfaces 64a. The first step surfaces 64a are positioned inner side of the second step surfaces 67a. The first step surfaces 64a are formed on the front surfaces of the step convex portions 62a in the Z-axis direction, and the second step surfaces 67a are formed on the side surfaces of the step convex portions 62a in the X-axis direction and the Y-axis direction.

In the present embodiment, third dumper materials 70c are filled and arranged in the spaces 63a between the first step surfaces 64a and the back surface of the dividing plate spring 90a. Preferably, the spaces 63 have a width that is approximately equal to the width W1 shown in FIG. 1D or the width W2 shown in FIG. 4C. In the present embodiment, each of the first step surfaces 64a is a contact surface with the third dumper material 70c. The third dumper materials 70c are preferably constituted by a similar material to that of the first dumper material 70a or the second dumper material 70b, but are not necessarily constituted by the same material.

The dividing plate spring 90a is provided with one or more through holes 98. The through hole 98 is smaller than the first step surface 64a and formed at a position where the third dumper material 70c is arranged on the upper surface of the first step surface 64a. Forming the through hole 98 facilitates the filling of third dumper materials 70c into the spaces 63, maintains the continuity to the third dumper materials 70c arranged on the upper surface (front surface in the Z-axis direction) of the dividing plate spring 90, and improves vibration absorption properties.

Preferably, the third dumper material 70c arranged on the upper surface (front surface in the Z-axis direction) of the dividing plate spring 90 has a formation pattern similar to that of the third dumper material 70c filled in the space 63, but does not necessarily have the same pattern. Preferably, the third dumper material 70c arranged on the upper surface (front surface in the Z-axis direction) of the dividing plate spring 90 has a thickness in the Z-axis direction similar to that of the third dumper material 70c filled in the space 63, but does not necessarily have the same thickness.

Each of the first step surfaces 64a has any area, but preferably has an area that is approximately the same as an area of the upper surface of the dumper stand 24, where the first dumper material 70a is arranged, for example. In the present embodiment, the third dumper materials 70c sandwich a part of the dividing plate spring 90a from top and bottom in the Z-axis direction at a position between the wire attachment portion 92a and the frame attachment portion 94a.

The first step surfaces 64a are arranged away from the wire attachment portion 92a at two points near the four corners of the frame 60 along the outer shape of the frame 60. The third dumper materials 70c are arranged based on the shapes of the first step surfaces 64a at two points along the outer shape of the frame 60 without any contact with the wire attachment portion 92a or the suspension wire 16.

In the present embodiment, the spaces 63 are formed between the frame 60 and parts of the dividing plate springs 90a to 90d positioned between the frame attachment portions 94a to 94d and the wire attachment portions 92a to 92d, and the third dumper members 70c as vibration absorption materials are arranged in the spaces 63. Thus, it is possible to effectively prevent the frame 60 as the movable portion from vibrating in the light axis direction in a frequency band related to the AF operation. Embodiments where the frame 60 vibrates in the light axis direction includes an embodiment where the four corners of the frame 60 vibrate uniformly in the Z-axis direction and an embodiment where the four corners of the frame 60 vibrate non-uniformly in the Z-axis direction. In the present embodiment, each of the third dumper materials 70c is arranged at the four corners, and the vibration can be thus effectively prevented in any embodiments.

In the present embodiment, the third dumper materials 70c are arranged, and thus it becomes possible to reduce a filling amount of the first dumper materials 70a and becomes unnecessary to accurately control a filling amount of the first dumper materials 70a. Furthermore, when the vibration restraint of the frame 60 in the X-Y axis directions is carried out by a means other than the first dumper materials 70a, or when the vibration restraint is unnecessary, the first dumper materials 70a may not be used. In addition, when the vibration restraint of the lens holder 40 and the frame 60 in the Z-axis direction is carried out by another means, or when the vibration restraint is unnecessary, the second dumper materials 70b may not be used.

As a result, for example, it is possible to prevent occurrence of a resonance point easily generated when having no third dumper materials 70c (particularly around 300 Hz, which is related to the AF operation). Thus, it is possible to effectively prevent deviation in focus even if a photographer moves particularly when taking moving images. In addition, the spaces 63 between the parts of the dividing plate springs 90a to 90d and the first step surfaces 64a of the frame 60 function as reservoirs for the third dumper materials 70c at the positions where the third dumper materials 70c are arranged, and the third dumper materials 70c do not fall off from the spaces 63.

In addition, the third dumper materials 70c are arranged away from the suspension wires 16 and the wire attachment portions 92a to 92d along the shape of the outer circumferential surface 67 of the frame 60. This configuration makes it possible to further effectively prevent the frame 60 as the movable portion from vibrating in the Z-axis direction.

The wire attachment portions 92a to 92d are arranged outside the notches 62 at the corners of the frame 60, and thus for example, it becomes easy to connect tips of the suspension wires 16 and the wire attachment portions 92a to 92d of the dividing plate springs 90a to 90d while maintaining a small size of the frame 60. The movement of the frame 60 in X-Y axis directions crossing the Z-axis can become smoother. The connections between the tips of the suspension wires 16 and the wire attachment portions 92a to 92d of the dividing plate springs 90a to 90d are made by soldering, laser welding, or the like, and a connection portion 16a is formed (see FIG. 1F to FIG. 1H).

Furthermore, the first step surfaces 64a of contact surfaces of the frame 60 touched by the third dumper materials 70c are arranged inner side of the second step surfaces 67a, and thus the third dumper materials 70c do not touch the inner circumferential surface of the case 11 even if the outer circumferential surface 67 of the frame 60 moves in the case 11 shown in FIG. 1A and touches the inner circumferential surface of the case 11. Thus, the third dumper materials 70c hardly drop or are peeled off from predetermined positions toward the inner circumferential surface of the case 11.

Moreover, in the present embodiment, the third dumper materials 70c touch both surfaces of the dividing plate springs 90a to 90d in the Z-axis direction, and vibration restraint effect can be thus further enhanced. Furthermore, the dividing plate springs 90a to 90d are provided with the through holes 98 at the positions where the third dumper materials 70c are arranged, and thus it becomes easier to fill the third dumper materials 70c via the through holes 98 and moreover arrange the third dumper materials 70c on both surfaces of the dividing plate springs 90a to 90d.

Furthermore, as shown in FIG. 1G, the wire attachment portions 92a to 92d have concave portions 99 recessed inside with U shape, and thus it becomes possible to easily attach the tips of the suspension wires 16 to the wire attachment portions 92a via the concave portions 99 with U shape and carry out laser welding or soldering.

As shown in FIG. 1F and FIG. 1G, an opening portion 91 is formed in the dividing plate springs 90a to 90d positioned between a pair of the first step portions 64a positioned near the corners of the frame 60, and the wire attachment portion 92a is formed in an intersection portion between a pair of arm portions 96 continued from the frame attachment portions 90a to 90d. Each of the arm portions 96 has a portion not in contact with the third dumper material 70c. In addition to the intersection portion between the arm portions 96, a bridge portion 97 bridging the arm portions 96 is formed.

In this configuration, it is possible to disperse a stress concentrated on the arm portions 96 into the bridge portion 97, improve strength of the wire attachment portions 92a to 92d, and effectively prevent the tips of the suspension wires 16 from coming off the wire attachment portions 92a to 92d.

The arm portions 96 have a portion where the dividing plate springs 90a to 90d become narrow in the middle of the arm portions 96 from the frame attachment portion 94a toward the wire attachment portions 92a to 92d. Thus, the wire attachment portions 92a to 92d have an improved elasticity, and the buckling of the suspension wires 16 can be prevented effectively.

In particular, in the present embodiment, as shown in FIG. 3A and FIG. 3B, the outer circumference of the lens holder 40 is provided with four (at least three, preferably four to eight) stopper convex portions 47a in the illustrated example protruding radially outside toward the frame 60 shown in FIG. 4A. As shown in FIG. 4A, each side of the frame 60 with a rectangular ring shape is provided with a stopper concave portion 66a housing the stopper convex portion 47a shown in FIG. 3A by corresponding to the stopper convex portion 47a.

Figure 8:
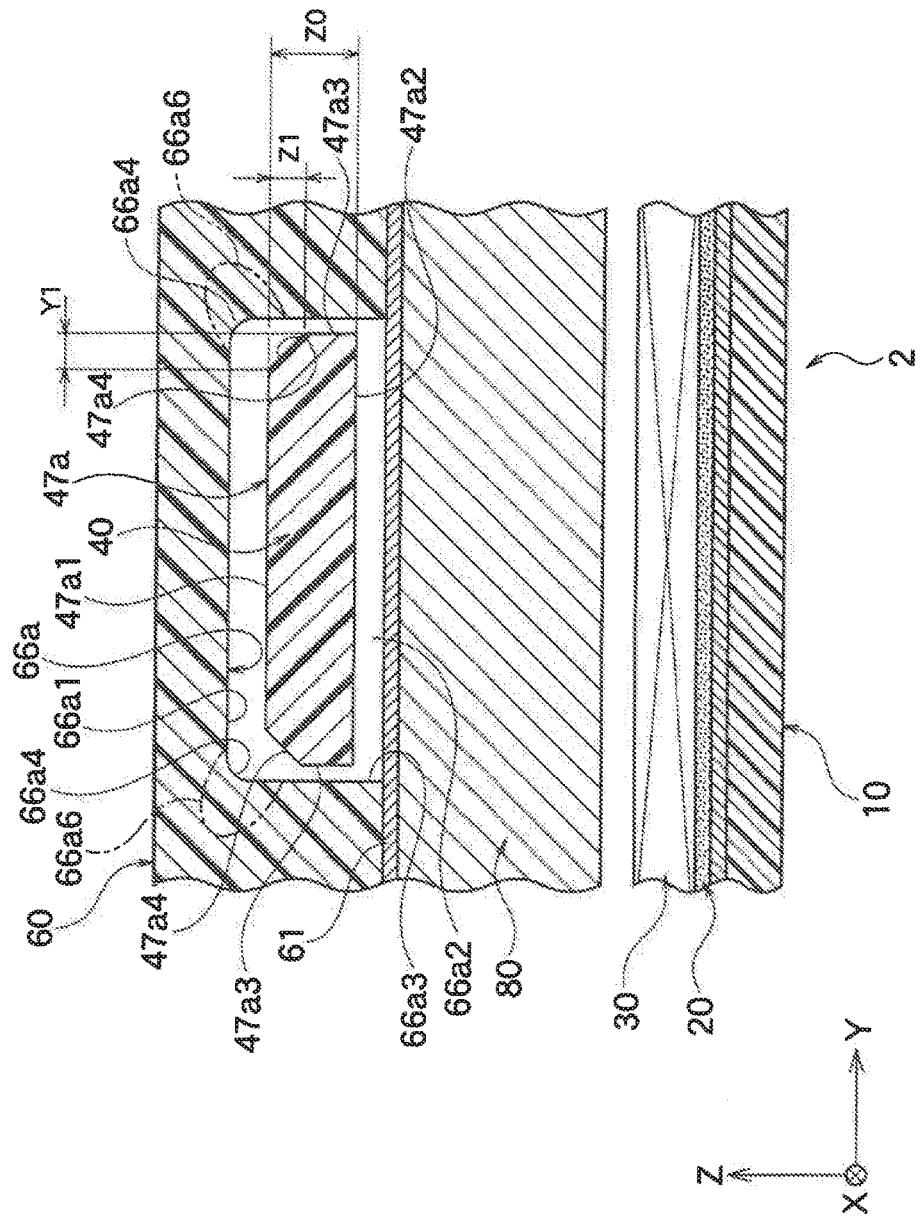
FIG. 8 is a cross sectional view of a main part along VIII-VIII line of FIG. 7.

As shown in FIG. 7 and FIG. 8, each of the stopper concave portions 66a is provided with a concave bottom surface 66a1 and concave side surfaces 66a3. The concave bottom surface 66a1 can be in surface contact with a first convex end surface 47a1 of the stopper convex portion 47a in the Z-axis direction. The concave side surfaces 66a3 can be in contact with convex side surfaces 47a3 approximately vertically crossing the first convex end surface 47a1 of the stopper convex portion 47a. The first convex end surface 47a1 faces the concave bottom surface 66a1 with a predetermined space, and the convex side surfaces 47a3 face the concave side surfaces 66a3 with a predetermined space.

A chamfering portion or an R curved surface portion is formed at convex intersection corners 47a4 and/or 47a5 between the first convex end surface 47a1 and the convex side surfaces 47a3. Thus, the convex intersection corners 47a4 and/or 47a5 are configured so as not to touch concave intersection corners 66a4 and/or 66a5 between the concave bottom surface 66a1 and the concave side surfaces 66a3. Incidentally, the concave intersection corners 66a4 and the convex intersection corners 47a4 are corners seen by the cross section of the Y-Z axes as shown in FIG. 8, and the concave intersection corners 66a5 and the convex intersection corners 47a5 are corners seen by the cross section of the X-Z axes as shown in FIG. 7.

In the lens drive device 2 according to the present embodiment, as shown in FIG. 8, the convex intersection corners 47a4 of the stopper convex portion 47a are provided with a chamfering portion or an R curved surface portion. In the example shown in FIG. 8, the convex intersection corners 47a4 are provided with a chamfering portion, and a length Z1 of the chamfering portion in the Z-axis direction is approximately 30 to 60% of a thickness Z0 of the stopper convex portion 47a in the Z-axis direction. A length Y1 of the chamfering portion in the Y-axis direction is approximately the same as the length Z1 of the chamfering portion in the Z-axis direction, but is not necessarily identical to each other. The lengths Y1 and Z1 of the chamfering portion are configured to be larger than a size of a chamfering portion or an R curved surface portion of the concave intersection corners 66a4, and the convex intersection corners 47a4 do not touch the concave intersection corners 66a4.

Incidentally, in the present embodiment, as shown in FIG. 8, the convex intersection corners 47a4 are processed into a chamfering portion, and the concave intersection corners 66a4 are processed into an R curved surface portion, but the convex intersection corners 47a4 may be processed into an R curved surface portion. When the concave intersection corners 66a4 are processed into a chamfering portion, the convex intersection corners 47a4 are preferably processed into a chamfering portion as well. Incidentally, if the convex intersection corners 47a4 are configured to have a size where the convex intersection corners 47a4 do not collide with the concave intersection corners 66a4, the convex intersection corners 47a4 may be processed into an R curved surface corner, and the concave intersection corners 66a4 may be processed into an R curved surface corner or a chamfering portion. In the present embodiment, a relation between the concave intersection corners 66a5 and the convex intersection corners 47a5 shown in FIG. 7 is the same as a relation between the concave intersection corners 66a4 and the convex intersection corners 47a4 shown in FIG. 8.

In the present embodiment, the corners 47a4 of the stopper convex portions 47a (the same applies to 47a5) do not collide with the corners 66a4 (66a5) of the concave portions 66a of the frame 60 even if a device including the lens drive device 2 is dropped. Thus, the corners 47a4 (the same applies to 47a5) and 66a4 (the same applies to 66a5) are hard to be chipped and hard to generate scrap. In the lens drive device 2, the collisions between the surfaces 47a1 (the same applies to 47a3) of the stopper convex portions 47a and the surfaces 66a1 (the same applies to 66a3) of the stopper concave portions 66a just occur at the time of falling, and the breakage of the frame 60 and the distortion of the lens holder 40 due to a drop impact are hard to occur.

In the present embodiment, the magnetic body plate 61 and the magnet 80 as the magnet component constituting a part of the drive portion in the light axis direction are fixed to the frame 60 so as to cover opening portions 66a2 of the stopper concave portions 66a in the Z-axis direction. As a result, second convex end surfaces 47a2 of the stopper convex portions 47a positioned on the opposite side of the first convex end surfaces 47a1 in the Z-axis direction can be in surface contact with the end surface in the Z-axis direction of the magnet component consisting of the magnet 80 and the magnetic body plate 61.

That is, the stopper convex portions 47a are inserted into the stopper concave portions 66a movably in the Z-axis direction in distances between the concave bottom surfaces 66a1 and the magnetic body plate 61. The movable distances in the Z-axis direction between the concave bottom surfaces 66a1 and the magnetic body plate 61 are not limited, but are preferably about 30 to 60% of the thickness Z0 of the convex portions 47a in the Z-axis direction (see FIG. 8). The movable distances in the Z-axis direction are larger than distances where the convex portions 47a can move in the X-axis and Y-axis directions in the concave portions 66a.

The movement of the lens holder 40 to the frame 60 in the Z-axis direction is limited within the distances between the magnetic body plate 61 and the concave bottom surfaces 66a1 of the concave portions 66a of the frame 60. This configuration can effectively limit a movement range of the lens holder 40 to the frame 60 in the light axis direction (Z-axis) without increase in the number of parts and contributes to downsizing of the device 2. Incidentally, the spaces between the side surfaces 47a3 of the convex portions 47a and the side surfaces 66a3 of the concave portions 66a are preferably small in a range where the movement of the lens holder 40 in the Z-axis direction is not limited, and the contact of the side surfaces 47a3 against the side surfaces 66a3 can prevent the lens holder 40 from rotating around the light axis against the frame 60.

In the present embodiment, since the frame 60 has a rectangular ring shape and the stopper concave portion 66a is formed on each side of the rectangular ring shape, the sensor component 41 containing IC chip or so (see FIG. 4B) can be arranged at the corner of the lens holder 40 and at the corner of the rectangular frame 60.

Incidentally, in the present embodiment, the stopper convex portions 47a may be provided with a thick portion 47a6 or 47a7 as shown in FIG. 7. The stopper convex portions 47a have an increased strength by forming the thick portion 47a6 or 47a7. The thick portion 47a6 is formed on the same side of the first convex end surface 47a1 at a position not in contact with the frame 60, and the thick portion 47a7 is formed on the same side of the second convex end surface 47a2 at a position not in contact with the frame 60. The thick portions 47a6 and 47a7 may gradually become thicker in the Z-axis direction toward the center of the light axis. This configuration improves a reinforcement function.

Second Embodiment

Figure 1I:
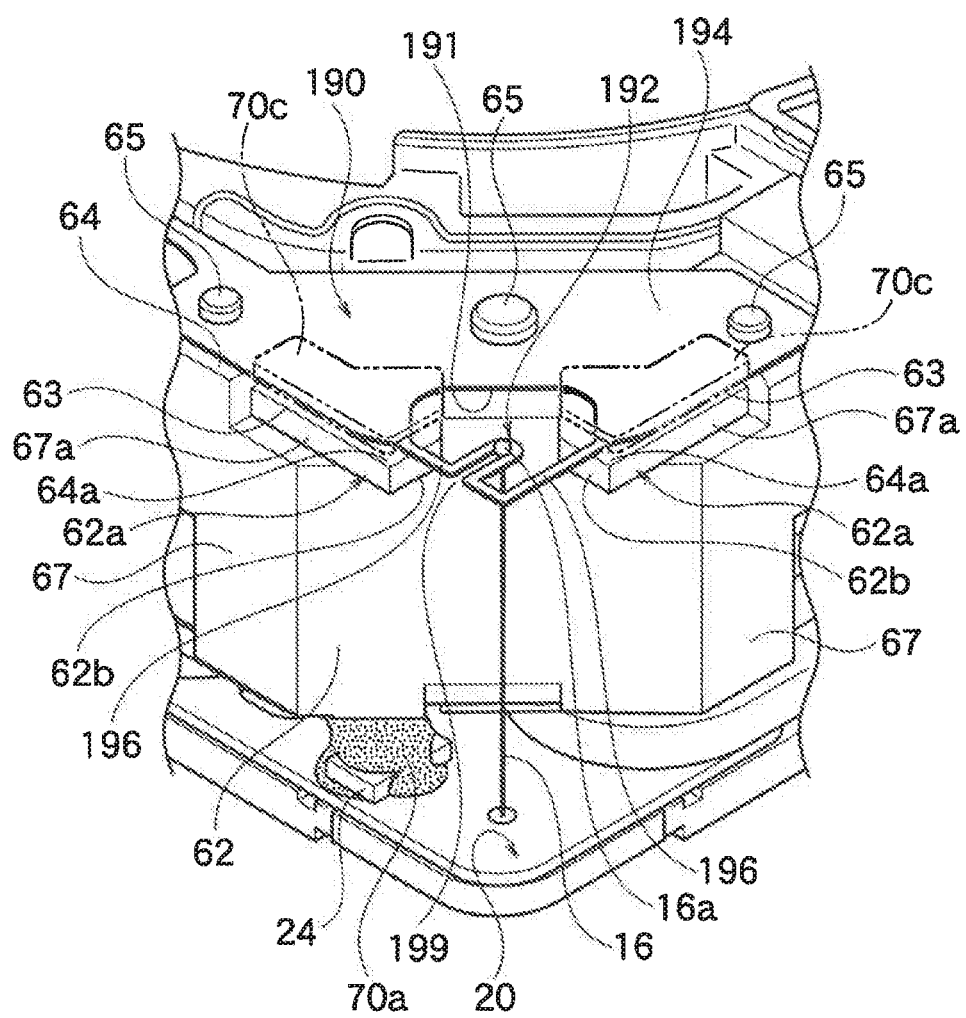
FIG. 1I is a partially perspective view showing a detail of a connection portion with a suspension wire of a front spring used for a lens drive device according to another embodiment of the present invention.
Figure 1J:
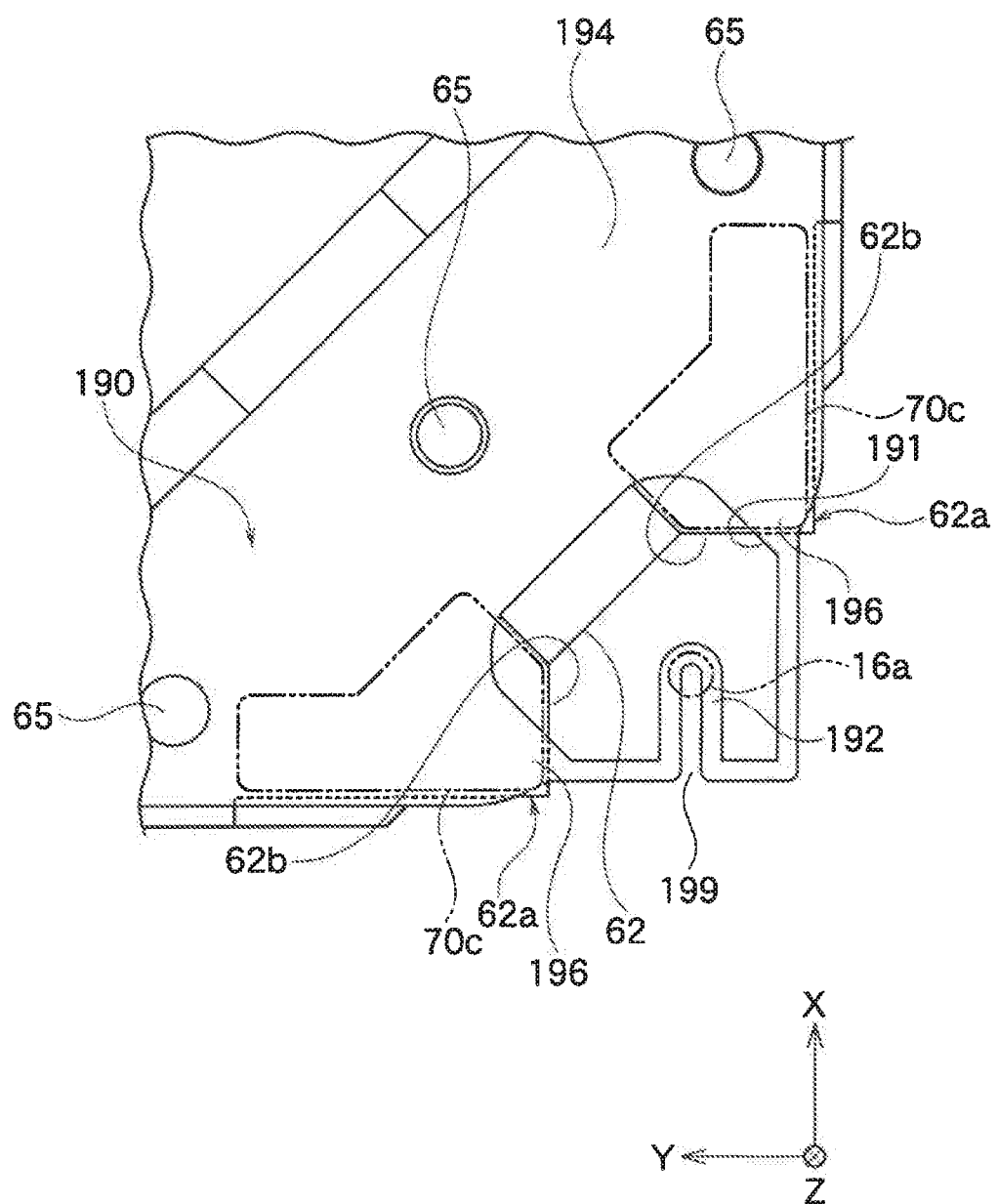
FIG. 1J is a partially plane view showing a detail of the connection portion with the suspension wire of the front spring shown in FIG. 1I.

As shown in FIG. 1I and FIG. 1J, a lens drive device according to another embodiment of the present invention is different only in a configuration of four dividing plate springs 190 constituting a front spring as an elastic member and is the same as the lens drive device according to First Embodiment in terms of the other parts and effects, and common parts will not be explained partially. Hereinafter, different parts from First Embodiment will be explained mainly.

The dividing plate springs 190 of the present embodiment are not provided with the through holes 98 or the bridge portion 97 shown in FIG. 1F and FIG. 1G. Opening portions 191 have different shapes from those of the opening portions 91. Arm portions 196 also have different shapes from those of the arm portions 96. Arm attachment portions 192 are similar to the concave portions 99 according to First Embodiment in terms of formation of concave portions 199 with U shapes. Frame attachment portions 194 have approximately the same shapes as those of the frame attachment portions 94a to 94d according to First Embodiment except that the through holes 98 are not formed. The other structures and effects of the present embodiment are similar to those of First Embodiment.

Third Embodiment

Figure 1K:
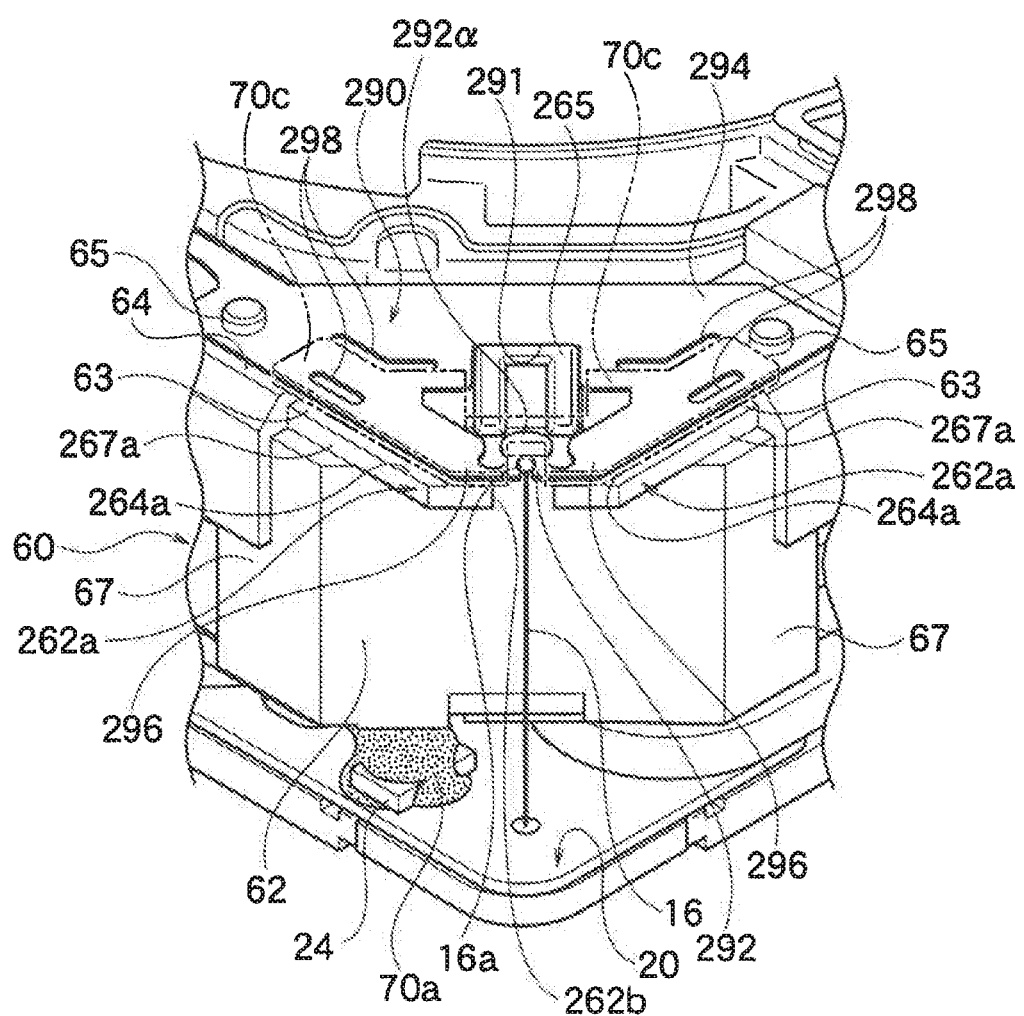
FIG. 1K is a partially perspective view showing a detail of a connection portion with a suspension wire of a front spring used for a lens drive device according to further another embodiment of the present invention.
Figure 1L:
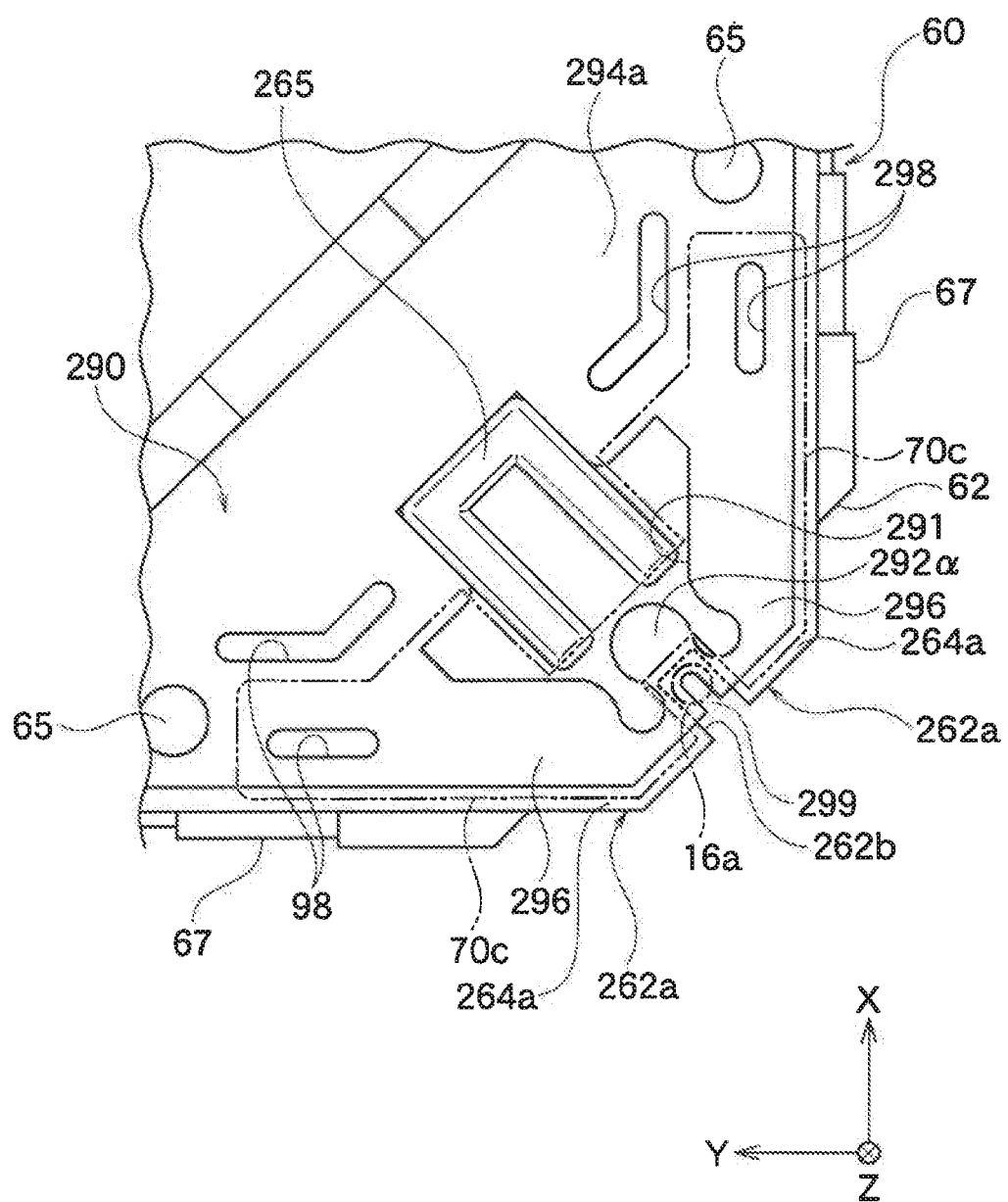
FIG. 1L is a partially plane view showing a detail of the connection portion with the suspension wire of the front spring shown in FIG. 1K.

As shown in FIG. 1K and FIG. 1L, a lens drive device according to another embodiment of the present invention is different only in configurations of four dividing plate springs 290 constituting a front spring as an elastic member and step convex portions 262a (corresponding to the step convex portions 62a) of the frame 60 and is the same as the lens drive device according to First Embodiment or Second Embodiment in terms of the other parts and effects, and common parts will not be explained partially. Hereinafter, different parts from the above-mentioned embodiments will be explained mainly.

Dividing plate springs 290 of the present embodiment are different in the number and arrangement of through holes 298 corresponding to the through holes 98 shown in FIG. 1F to FIG. 1H and are also different in shape of wire attachment portions 292. The wire attachment portions 292 are similar to the concave portions 99 of First Embodiment in terms of formation of concave portions 299 with U shape, but a tongue portion 292α with an approximately circular shape is formed integrally with the plate spring 290 inside the concave portion 299 (light axis side of lens). At least a part (large part in the figures) of the tongue portion 292α is in contact with first step surfaces 264a of step convex portions 262a via the third dumper materials 70c.

Second step surfaces 267a of the step convex portions 262a are similar to the second step surface 67a of the above-mentioned embodiments, but a notch 262b of the step convex portion 262a is narrower than the notch 62b of the above-mentioned embodiments. The wire attachment portion 292 excluding the tongue portion 292α is positioned on the notch 262b. The notch 262b has a size where the suspension wire 16 passes through the notch 262b and the tongue portion 292α touches the first step surfaces 264a of the step convex portions 262a via the third dumper materials 70c. The third dumper materials 70c do not touch the connection portion 16a of the wire 16.

In the present embodiment, the opening portions 291 have different shapes from those of the opening portions 91 of the above-mentioned embodiments, and the bridge portions 97 are not formed. Attachment convex portions 265 formed on the front surfaces 64 of the frame 60 enter the opening portions 291 so that the dividing plate springs 290 and the frame 60 are positioned. Arm portions 296 also have different shapes from those of the arm portions 96 of above-mentioned embodiments. Furthermore, frame attachment portions 294 basically have approximately similar shapes to those of the frame attachment portions 94a to 94d of First Embodiment except that the shape and number of the through holes 298 and the shape of the opening portions 291 are different.

In the present embodiment, the tongue portion 292α with an approximately circular shape is formed integrally with the plate spring 290 inside (light axis side of lens) the concave portion 299 of the wire attachment portion 292. At least a part (large part in the figures) of the tongue portion 292α is in contact with the first step surfaces 264a of the step convex portions 262a via the third dumper materials 70c.

That is, in the present embodiment, a part of the wire attachment portion 292 touches the first step surfaces 264a of the step convex portions 262a via the third dumper materials 70c in the vicinity of the connection portion 16a not in contact with the third dumper materials 70c. This improves resonance restraint effects and particularly improves a resonance restraint effect in blur correction directions (X-axis and Y-axis directions). The other structures and effects of the present embodiment are similar to those of First Embodiment and Second Embodiment.

Fourth Embodiment

Figure 1N:
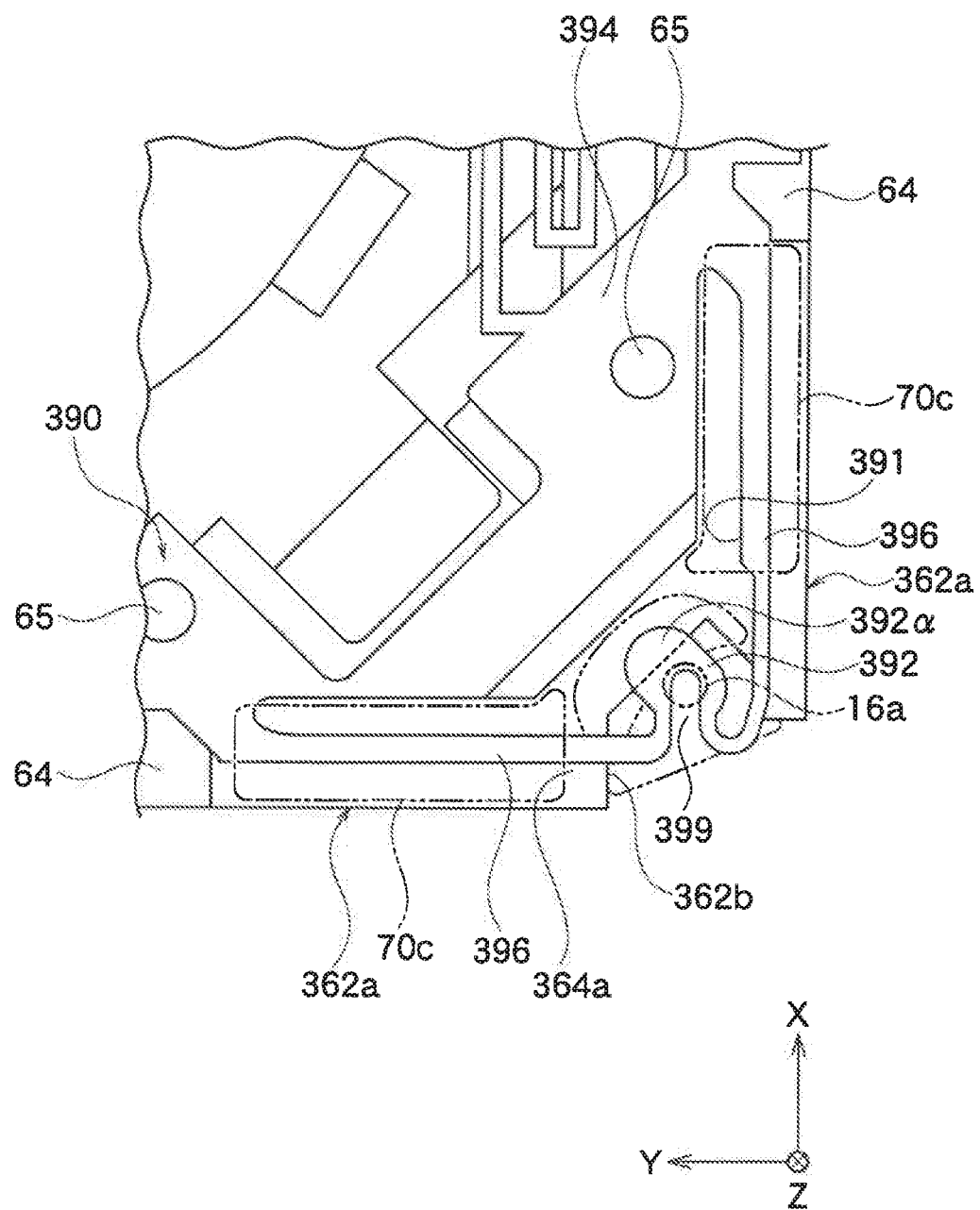
FIG. 1N is a partially plane view showing a detail of the connection portion with the suspension wire of the front spring shown in FIG. 1M.

As shown in FIG. 1M and FIG. 1N, a lens drive device according to another embodiment of the present invention is different only in configurations of four dividing plate springs 390 constituting a front spring as an elastic member and step convex portions 362a (corresponding to the step convex portions 62a) of the frame 60 and is the same as the lens drive devices according to First Embodiment to Third Embodiments in terms of the other parts and effects, and common parts will not be explained partially. Hereinafter, different parts from the above-mentioned embodiments will be explained mainly.

In the dividing plate springs 390 of the present embodiment, a through hole 398 corresponding to the through hole 98 shown in FIG. 1F and FIG. 1G is communicated with an opening portion 391, and the shapes of a frame attachment portion 394 and a wire attachment portion 392 are different. The wire attachment portion 392 is similar to the concave portion 199 of Second Embodiment in terms of formation of a concave portion 399 with an U shape, but a tongue portion 392α with an approximately semicircular shape is formed integrally with the plate spring 390 inside the concave portion 399 (light axis side of lens). At least a part (large part in the figures) of the tongue portion 392α is in contact with first step surfaces 364a of step convex portions 362a via the third dumper materials 70c.

In the present embodiment, the step convex portions 362a are not provided with a step surface corresponding to the second step surfaces 67a and 267a of the above-mentioned embodiments. A notch 362b of the step convex portions 362a is narrower than the notch 62b of the above-mentioned embodiments, but is wider than the notch 262b. The wire attachment portion 392 excluding the tongue portion 392α is positioned on the notch 362b.

The notch 362b has a size where the suspension wire 16 passes through the notch 362b and the tongue portion 392α touches the first step surfaces 364a of the step convex portions 362a via the third dumper materials 70c. The third dumper materials 70c do not touch the connection portion 16a of the wire 16. In the notch 362b, the third dumper material 70c may be imbedded at the lower position of the wire attachment portion 392 in the Z-axis direction so as to avoid touching the wire attachment portion 392 and the connection portion 16a. The third dumber material 70c imbedded into the notch 362b is in contact with only the suspension wire 16 and an inner surface of the notch 362b.

In the present embodiment, the opening portions 391 have different shapes from those of the opening portions 91 of the above-mentioned embodiments, and the bridge portions 97 are not formed. Arm portions 396 also have different shapes from those of the arm portions 96 of above-mentioned embodiments. Furthermore, frame attachment portions 394 basically have approximately similar shapes to those of the frame attachment portions 94a to 94d of First Embodiment except that the shape and number of the through holes 398 and the shape of the opening portions 391 are different.

In the present embodiment, the tongue portion 392α with an approximately circular shape is formed integrally with the plate spring 390 inside (light axis side of lens) the concave portion 399 of the wire attachment portion 392. At least a part (large part in the figures) of the tongue portion 392α is in contact with the first step surfaces 364a of the step convex portions 362a via the third dumper materials 70c. That is, in the present embodiment, a part of the wire attachment portion 392 touches the first step surfaces 364a of the step convex portions 362a via the third dumper materials 70c near the connection portion 16a not in contact with the third dumper materials 70c. This improves resonance restraint effects and particularly improves a resonance restraint effect in blur correction directions (X-axis and Y-axis directions). The other structures and effects of the present embodiment are similar to those of First Embodiment to Third Embodiment.

Fifth Embodiment

Figure 9:
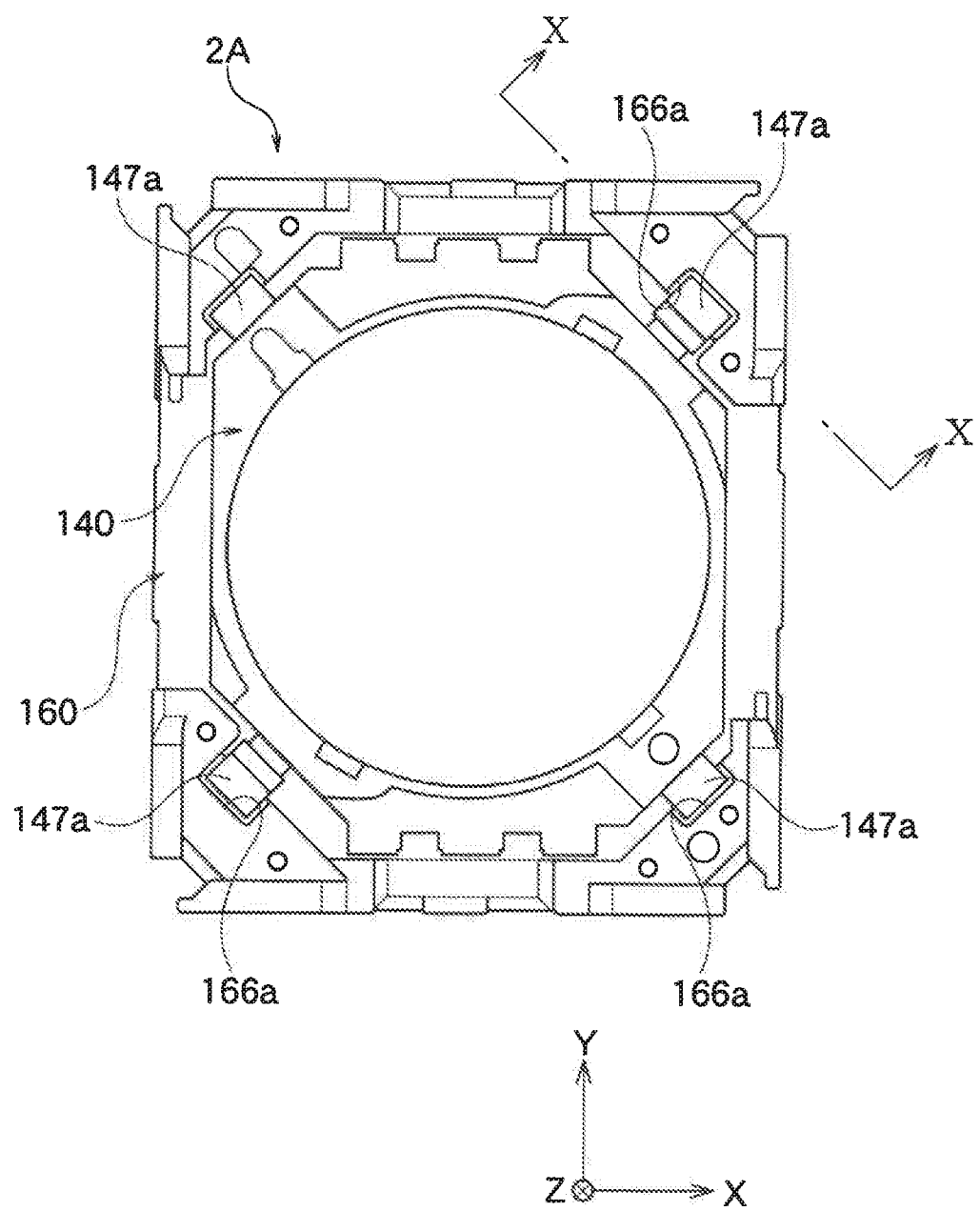
FIG. 9 is a plane view where a frame and a lens holder of a lens drive device according to another embodiment of the present invention are combined.
Figure 10:
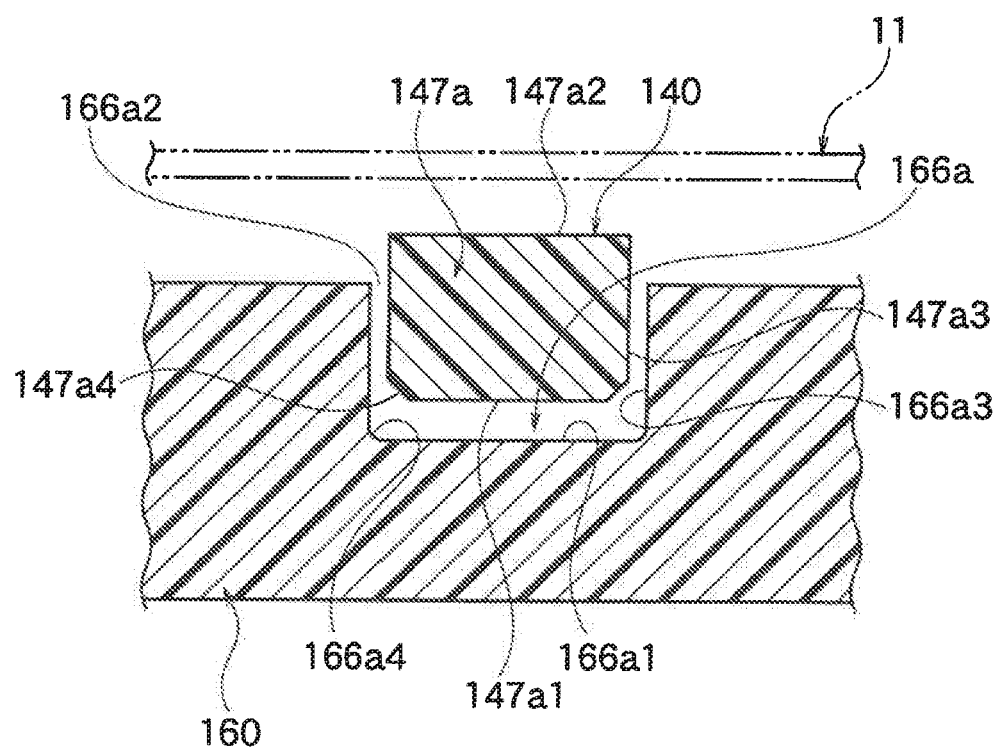
FIG. 10 is a cross sectional view of a main part along X-X line of FIG. 9.

As shown in FIG. 9 and FIG. 10, a lens drive device 2A according to another embodiment of the present invention is different only in shapes of a frame 160 and a lens holder 140 and is the same as the lens drive devices according to First Embodiment to Fourth Embodiments in terms of the other parts and effects, and common parts will not be explained partially. Hereinafter, different parts from the above-mentioned embodiments will be explained mainly. In the present embodiment, the frame 160 corresponds to the frame 60 of the above-mentioned embodiments, and the lens holder 140 corresponds to the lens holder 40 of the above-mentioned embodiments, but common parts will not be explained partially.

As shown in FIG. 9, the frame 160 of the present embodiment has a rectangular ring shape, stopper concave portions 166a are formed at positions of four corners of the rectangular ring shape. The lens holder 140 is provided with four stopper convex portions 147a by corresponding to the positions. In the present embodiment, as shown in FIG. 10, the stopper concave portion 166a is provided with a concave bottom surface 166a1 in the Z-axis direction, an opening portion 166a2 opening in the Z-axis direction, and concave side surfaces 166a3 approximately vertically crossing the bottom surface 166a1. In the present embodiment, a lower surface of the stopper convex portion 147a in the Z-axis direction is a first convex end surface 147a1, and the first convex end surface 147a1 faces the concave bottom surface 166a1 and can be in surface contact therewith. The concave side surfaces 166a3 face convex side surfaces 147a3 approximately vertically crossing the first convex end surface 147a1 of the stopper convex portion 147a with a predetermined space.

In the present embodiment, a second convex end surface 147a2 positioned on the opposite side of the first convex end surface 147a1 of the convex portion 147a in the light axis direction faces the inner surface of the case 11 (shown as the two-dot chain line in FIG. 10) shown in FIG. 1A and can be in surface contact therewith. As a result, the stopper convex portion 147a is inserted in the stopper concave portion 166a movably in the Z-axis direction between the concave bottom surface 166a1 and the inner surface of the case 11.

As shown in FIG. 10, a chamfering portion or an R curved surface portion is formed in convex intersection corners 147a4 of the stopper convex portion 147a. In the example shown in FIG. 10, the convex intersection corners 147a4 are provided with a chamfering portion and do not touch concave intersection corners 166a4.

This configuration can also effectively limit a movement range of the lens holder 140 to the frame 160 in the light axis direction without increase in the number of parts and contributes to downsizing of the device. In the present embodiment, the convex portions 147a are arranged at the positions of the corners of the frame 160, and this can effectively utilize the corners and contributes to downsizing of the device.

Sixth Embodiment

As shown by the two-dot chain lines in FIG. 8, a lens drive device according to another embodiment of the present invention is different only in formation of relief portions 66a6 at the concave intersection corners 66a4 and is the same as the lens drive devices according to First Embodiment to Fifth Embodiments in terms of the other parts and effects, and common parts will not be explained partially. Hereinafter, different parts from the above-mentioned embodiments will be explained mainly.

In the present embodiment, the relief portions 66a6 are formed so as not to touch the convex intersection corners 47a4, and the convex intersection corners 47a4 may not be provided with a chamfering portion or an R curved surface portion. The convex intersection corners 47a4 do not touch the concave intersection corners 66a4 due to the relief portions 66a6.

Also in the present embodiment, even if a device including the lens drive device is dropped, the corners 47a4 of the stopper convex portion 47a do not collide with the concave portions 66a of the frame 60, and the corners 47a4 are hard to be chipped and hard to generate scrap. In the drop of the lens drive device, the collision between the surfaces 47a1 and 47a3 of the stopper convex portion 47a and the surfaces 66a1 and 66a3 of the stopper concave portion 66a just occurs, and the breakage of the frame 60 and the distortion of the lens holder 40 due to a drop impact are hard to occur.

Incidentally, the present invention is not limited to the above-mentioned embodiments and may be changed variously. For example, the dumper stands 24 as pedestals are fixed to the surface of the circuit board 20 by reflowing or so, but may be formed integrally with the circuit board.

In the above-mentioned embodiments, the rear convex portions 69 protruding toward the dumper stands 24 are formed on the corner back surfaces 68 of the frame 60 as a movable portion for blur correction, but are not necessarily formed. Providing the rear convex portions 69 makes it easier to adjust a space width of the first dumper space along the Z-axis direction, but the rear convex portions 69 should not exist depending on the height of the dumper stands 24 in the Z-axis direction, for example.

In the above-mentioned embodiments, the first drive axis and the second drive axis are arranged in parallel to each side of the base portion 10 and the circuit board 20 with rectangular plate shapes, but are not limited thereto. For example, the first drive coils 30a and the second drive coils 30b may be arranged so that the first drive axis and the second drive axis are arranged diagonally on the base portion 10 and the circuit board 20 with rectangular plate shapes.

Furthermore, in the above-mentioned embodiments, the single two-way magnet 80 has two functions of the blur correction magnet and the automatic focus magnet, but separate magnets may be prepared and mounted.

In the above-mentioned embodiments, the first drive axis and the second drive axis have an intersection angle of 90 degrees, but may have an intersection angle other than 90 degrees in the present invention.

In the above-mentioned embodiments, the four suspension wires 16 are used as a means of holding the frame 60 as a movable portion for blur correction movably along the driving plane (including the X-axis and the Y-axis) against the base portion 10 as a fixed portion, but the number of the suspension wires is not limited to four and is any plurality.

The front springs 90 and 190 as an elastic member are not limited to a plate spring with a flat plate shape divided into four pieces, and may consist of two pieces, four or more pieces, or a single spring.

Furthermore, the support portion is not limited to the suspension wire 16, and may be a plate spring, a ball bearing, or another support portion. The tongue portion 292α or 392α in Third Embodiment or Fourth Embodiment mentioned above is not limited to an approximately circular shape or an approximately semicircular shape, and may be also preferably an approximately oval shape, an approximately semi-oval shape, a trapezoid shape, or another polygonal shape. The tongue portions 292α and 392α preferably have a specific shape becoming wider from the wire attachment portion 292 or 392 toward a protrusion direction. In such a shape, it is possible to increase a contact surface with the third dumper material 70c without interfering with the arm portions 296 or 396, and vibration restraint effect is improved.

NUMERICAL REFERENCES

2 . . . lens drive device
10 . . . base portion
11 . . . case
12 . . . base opening portion
14 . . . cylindrical convex portion
16 . . . suspension wire
16a . . . connection portion
18a, 18b . . . position sensor
20 . . . circuit board
22 . . . board opening portion
23 . . . connector portion
24 . . . dumper stand
30 . . . blur correction coil
30a . . . first drive coil
30b . . . second drive coil
40, 140 . . . lens holder
41 . . . sensor component
42 . . . front surface
43a to 43d . . . attachment convex portion
44a, 44b . . . plate spring attachment portion
45 . . . back surface
46 . . . focus coil
47 . . . outer circumferential surface
47a, 147a . . . stopper convex portion
47a1, 147a1 . . . first convex end surface
47a2, 147a2 . . . second convex end surface
47a3, 147a3 . . . convex side surface
47a4, 47a5, 147a4 . . . convex intersection corner
47a6, 47a7 . . . thick portion
48 . . . inner circumferential surface
49 . . . step portion
50 . . . rear spring
50a, 50b . . . dividing plate spring
52a, 52b . . . frame attachment portion
54a, 54b . . . holder attachment portion 55a to 55d ... meandering portion
60, 160 ... frame
61 ... magnetic body plate
62 ... notch
62a, 262a, 362a ... step convex portion
62b, 262b, 362b ... notch
63 ... space
64 ... front surface
64a, 264a, 364a ... first step surface
65, 265 ... attachment convex portion
66 ... magnet attachment concave portion
66a, 166a ... stopper concave portion
66a1, 166a1 ... concave bottom surface
66a2, 166a2 ... opening portion
66a3, 166a3 ... concave side surface
66a4, 66a5, 166a4 ... concave intersection corner
66a6 ... relief portion
67 ... outer circumferential surface
67a, 267a ... second step surface
68 ... corner back surface
69 ... rear convex portion
70a ... first dumper material
70b ... second dumper material
70c ... third dumper material
72 ... inner convex portion
73 ... front surface
74 ... dumper concave portion
80 ... two-way magnet
80a ... first drive magnet
80b ... second drive magnet
90 ... front spring
90a to 90d, 190, 290, 390 ... dividing plate spring
91, 191, 291, 391 ... opening portion
92a to 92d, 192, 292, 392 ... wire attachment portion (support attachment portion)
292α, 392α ... tongue portion
93a to 93d ... holder attachment portion
94a to 94d, 194, 294, 394 ... frame attachment portion
95a to 95d ... meandering portion
96, 196, 296, 396 ... arm portion
97 ... bridge portion
98, 298, 398 ... through hole
99, 199 ... concave portion
100 ... lens

The invention claimed is:

1. A lens drive device comprising:
a lens holder capable of holding at least one lens;
a frame arranged around the lens holder and holding the lens holder relatively movable along a light axis of the lens; and
a drive portion in a light axis direction moving the lens holder relatively to the frame along the light axis, wherein
at least three stopper convex portions protruding toward the frame are formed on an outer circumference of the lens holder,
stopper concave portions housing each of the stopper convex portions are formed on the frame correspondingly to the stopper convex portions,
the stopper concave portion is provided with a concave bottom surface capable of being in surface contact with a first convex end surface of the stopper convex portion in the light axis direction and a concave side surface capable of being in surface contact with a convex side surface crossing the first convex end surface of the stopper convex portion,
a convex intersection corner between the first convex end surface and the convex side surface is provided with one of a chamfering portion and an R curved surface portion so as not to touch a concave intersection corner between the concave bottom surface and the concave side surface,
the frame is provided with a magnet component constituting a part of the drive portion in the light axis direction,
the magnet component is attached to the frame so that a second convex end surface of the stopper convex portion positioned on an opposite side of the first convex end surface in the light axis direction can be in surface contact with an end surface of the magnet component in the light axis direction, and
the stopper convex portion is inserted in the stopper concave portion so as to be movable between the concave bottom surface and the magnet component in the light axis direction.

2. The lens drive device according to claim 1, wherein
the frame has a polygonal ring shape, and
the stopper concave portions are formed at positions of sides of the polygonal ring shape.

3. The lens drive device according to claim 2, wherein the stopper convex portion is provided with a thick portion that is located at the side of the light axis of the stopper convex portion and is thicker than a tip of the stopper convex portion.

4. The lens drive device according to claim 3, wherein the thick portion is formed on the same side as the first convex end surface at a position not in contact with the frame.

5. The lens drive device according to claim 1, wherein the stopper convex portion is provided with a thick portion that is located at the side of the light axis of the stopper convex portion and is thicker than a tip of the stopper convex portion.

6. The lens drive device according to claim 5, wherein the thick portion is formed on the same side as the first convex end surface at a position not in contact with the frame.

7. The lens drive device according to claim 6, wherein the thick portion gradually becomes thicker in the light axis direction toward a center of the light axis.

8. The lens drive device according to claim 5, wherein the thick portion gradually becomes thicker in the light axis direction toward a center of the light axis.

9. A lens drive device comprising:
a lens holder capable of holding at least one lens;
a frame arranged around the lens holder and holding the lens holder relatively movable along a light axis of the lens; and
a drive portion in a light axis direction moving the lens holder relatively to the frame along the light axis, wherein
at least three stopper convex portions protruding toward the frame are formed on an outer circumference of the lens holder,
stopper concave portions housing each of the stopper convex portions are formed on the frame correspondingly to the stopper convex portions,
the stopper concave portions are provided with a concave bottom surface capable of being in surface contact with a first convex end surface of the stopper convex portion in the light axis direction and a concave side surface capable of being in surface contact with a convex side surface crossing the first convex end surface of the stopper convex portion, a concave intersection corner between the concave bottom surface and the concave side surface is provided with a relief portion so as not to touch a convex intersection corner between the first convex end surface and the convex side, the frame is provided with a magnet component constituting a part of the drive portion in the light axis direction, the magnet component is attached to the frame so that a second convex end surface of the stopper convex portion positioned on an opposite side of the first convex end surface in the light axis direction can be in surface contact with an end surface of the magnet component in the light axis direction, and the stopper convex portion is inserted in the stopper concave portion so as to be movable between the concave bottom surface and the magnet component in the light axis direction.

* * * * *